(12) United States Patent
Moon

(10) Patent No.: US 12,257,512 B2
(45) Date of Patent: Mar. 25, 2025

(54) METHOD AND APPARATUS FOR PROVIDING INFORMATION RELATED TO INTERACTION BETWEEN USERS IN GAME

(71) Applicant: NEXON KOREA CORPORATION, Seongnam-si (KR)

(72) Inventor: Sae Byuk Moon, Seongnam-si (KR)

(73) Assignee: NEXON KOREA CORPORATION, Seongnam-si (KR)

( * ) Notice: Subject to any disclaimer, the term of this patent is extended or adjusted under 35 U.S.C. 154(b) by 0 days.

(21) Appl. No.: 17/465,058

(22) Filed: Sep. 2, 2021

(65) Prior Publication Data
US 2022/0062775 A1    Mar. 3, 2022

(30) Foreign Application Priority Data
Sep. 2, 2020 (KR) .................. 10-2020-0111501

(51) Int. Cl.
*A63F 13/00* (2014.01)
*A63F 13/795* (2014.01)
*A63F 13/87* (2014.01)

(52) U.S. Cl.
CPC .......... *A63F 13/795* (2014.09); *A63F 13/87* (2014.09); *A63F 2300/556* (2013.01); *A63F 2300/572* (2013.01)

(58) Field of Classification Search
CPC ............. G07F 17/3239; G07F 17/3225; G07F 17/3272; G07F 17/3211
See application file for complete search history.

(56) References Cited

U.S. PATENT DOCUMENTS

| 6,848,997 B1 | 2/2005 | Hashimoto et al. |
| 8,353,772 B2 * | 1/2013 | Callery ............... G07F 17/3276 463/42 |
| 2002/0188527 A1 * | 12/2002 | Dillard ............... G06Q 30/0601 705/26.1 |

(Continued)

FOREIGN PATENT DOCUMENTS

| JP | 2008113782 A | 5/2008 |
| KR | 20000054783 A | 9/2000 |

(Continued)

OTHER PUBLICATIONS

Mikethecoder4, Kill Counter, version: 3.3.4_https://www.esoui.com/downloads/info337-KillCounterhtml; Nov. 7, 2015; 3 pages.

(Continued)

*Primary Examiner* — David L Lewis
*Assistant Examiner* — Eric M Thomas
(74) *Attorney, Agent, or Firm* — Kilpatrick Townsend & Stockton LLP

(57) ABSTRACT

Provided are an apparatus and a method of providing information about interaction between users, the method including obtaining, from a stored game log, statistical information related to a certain interaction event that occurred between a user and another user; displaying an interface that displays another user who has had most occurrences of the certain interaction event with the user, based on the statistical information; and displaying at least one other user in an order from a greatest number of times the certain interaction event occurred with the user, based on a user input of expanding the interface.

20 Claims, 11 Drawing Sheets

(56) References Cited

U.S. PATENT DOCUMENTS

| | | | | |
|---|---|---|---|---|
| 2013/0090908 A1* | 4/2013 | Dewey | ............... | G16B 5/00 |
| | | | | 703/11 |
| 2017/0249801 A1* | 8/2017 | Malek | ............ | G07F 17/3255 |
| 2018/0005483 A1* | 1/2018 | Washington | ......... | G07F 17/3246 |

FOREIGN PATENT DOCUMENTS

| | | | | |
|---|---|---|---|---|
| KR | 10-2002-0007092 A | | 1/2002 | |
| KR | 10-2007-0108417 A | | 11/2007 | |
| KR | 10-2015-0009619 A | | 1/2015 | |
| KR | 0-2011-0081395 A | | 12/2016 | |
| KR | 10-2018-0022493 A | | 3/2018 | |
| WO | WO-2007030621 A1 * | 3/2007 | ............ | H04H 60/27 |

OTHER PUBLICATIONS

Byun Mi-Sook, "Check out the Bagg OP.GG Battlegrounds history search," FPS Games/Battlegrounds Dec. 3, 2017, https://byeon1211.tistory.com/199 28 pages.

Notification of Reason for Refusal for Korean Application No. 10-2020-0111501 mailed Feb. 22, 2022, 19 pages.

Korean Office Application No. 2020-0111501 mailed Sep. 26, 2022, all pages.

\* cited by examiner

FIG. 7

| | | |
|---|---|---|
| | INTERACTION INFORMATION □ ✕ | |
| 710 — | USER I HAVE MATCHED WITH MOST (LAST WEEK) | USER A — 720 |
| 715 — | USER I HAVE MATCHED WITH MOST (ALL TIME) | USER E — 725 |
| | USER I HAVE WON MOST (LAST WEEK) | USER A |
| | USER I HAVE WON MOST (ALL TIME) | USER F |
| | USER WHO HAVE WON ME MOST (LAST WEEK) | USER B |
| | USER WHO HAVE WON ME MOST (ALL TIME) | USER G |
| | USER I HAVE ACCOMPANIED WITH MOST (LAST WEEK) | USER C |
| | USER I HAVE ACCOMPANIED WITH MOST (ALL TIME) | USER H |
| | USER I HAVE TRADED WITH MOST (LAST WEEK) | USER D |
| | USER I HAVE TRADED WITH MOST (ALL TIME) | USER I |

700

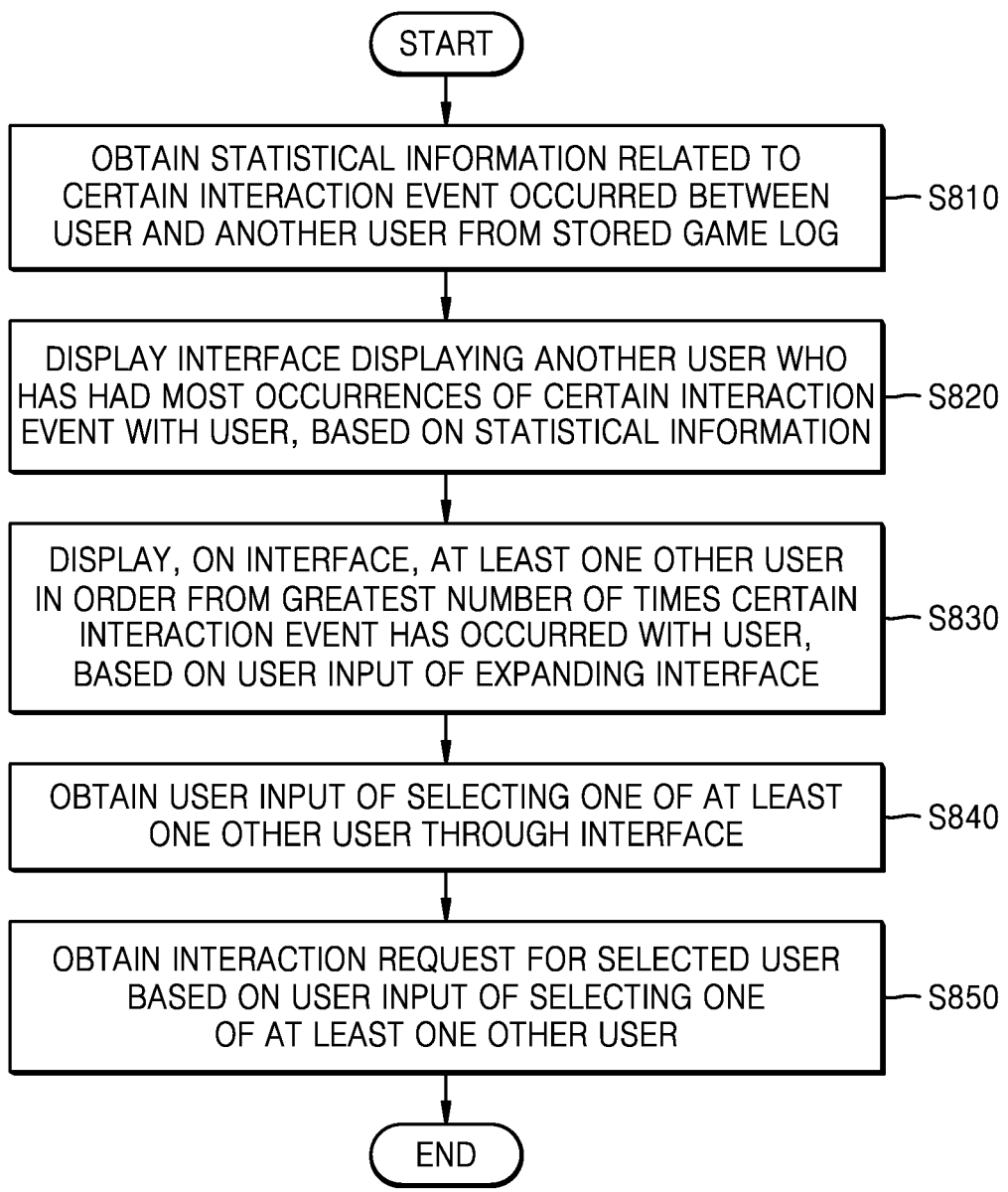

METHOD AND APPARATUS FOR PROVIDING INFORMATION RELATED TO INTERACTION BETWEEN USERS IN GAME

CROSS-REFERENCE TO RELATED APPLICATION

This application is based on and claims priority under 35 U.S.C. § 119 to Korean Patent Application No. 10-2020-0111501, filed on Sep. 2, 2020, in the Korean Intellectual Property Office, the disclosure of which is incorporated by reference herein in its entirety.

BACKGROUND

1. Field

The present disclosure relates to a method and an apparatus for providing information related to an occurrence of an interaction between users in a game, and more particularly, to a method and an apparatus for providing an interface displaying information related to an occurrence of an interaction between users in a game.

2. Description of the Related Art

With the development of computing devices and network environments, users who enjoy online-based games using various wired and wireless communication apparatuses are increasing significantly. In an online game, a user may interact with other users through various forms of interaction, such as, having a match, forming a team or alliance to cooperate to achieve a common goal, or trading with each other on an economic system in the game.

Establishing a human network between users is becoming an important factor to effectively provide an online game. In an existing online game, network formation between users is generally supported through an in-game community system, such as a guild or a friend list. However, the in-game community system is passive, which requires a user to directly sign up or register and requires an approval process from the other party. Therefore, even when an interaction occurs between users, it often does not lead to a lasting relationship.

Accordingly, in order to more actively establish a network between users, a technology that is capable of easily checking information related to an occurrence of an interaction between users and easily requesting another user for an additional interaction is required.

SUMMARY

The present disclosure provides a method of providing an interface that displays information related to an occurrence of an interaction between users.

Additional aspects will be set forth in part in the description which follows and, in part, will be apparent from the description, or may be learned by practice of the presented embodiments of the disclosure.

According to various embodiments of the present disclosure, provided is a method of providing information about interaction between users, the method including obtaining, from a stored game log, statistical information related to a certain interaction event that occurred between a user and another user; displaying an interface that displays another user who has had most occurrences of the certain interaction event with the user, based on the statistical information; and displaying at least one other user in an order from a greatest number of times the certain interaction event occurred with the user, based on a user input of expanding the interface.

According to an embodiment, the obtaining of the statistical information may include extracting, from the stored game log, a certain interaction event log generated between the user and the other user; and obtaining information on at least one other user who has had occurrences of the certain interaction event with the user and a number of times the certain interaction event that has occurred with respect to the at least one other user by analyzing the extracted certain interaction event log.

According to an embodiment, the certain interaction event may include at least one of a match between the user and another user, a victory of the user over another user, a defeat of the user by another user, a common group participation of the user and another user, performing of common content of the user and another user, and an item trade between the user and another user.

According to an embodiment, the method may further include setting, by the user input, whether to expose a user to the interface of another user, and the obtaining of the statistical information may include obtaining statistical information related to at least one other user who has had the certain interaction event with the user among users set to be exposed to the interface.

According to an embodiment, when the user is set not to be exposed to the interface, the statistical information may not be obtained, and another user who has had occurrences of the certain interaction event with the user may not be displayed on the interface.

According to an embodiment, the statistical information may be statistical information related to the certain interaction event that has occurred between the user and another user in a certain period.

According to an embodiment, the obtaining of the statistical information may include obtaining first statistical information related to the certain interaction event that has occurred between the user and the other user in a first period; and obtaining second statistical information related to the certain interaction event that has occurred between the user and the other user in a second period, and the displaying of the interface may include displaying, on the interface, another user who has had most occurrences of the certain interaction event with the user in the first period, based on the first statistical information; and displaying, on the interface, another user who has had most occurrences of the certain interaction event with the user in the second period, based on the second statistical information.

According to an embodiment, the method may further include obtaining, via the interface, a user input of selecting one of the at least one other user; and obtaining an interaction request for a selected user based on the user input of selecting one of the at least one other user.

According to an embodiment, the interaction request may include at least one of a match request for the selected user, a group participation request for the selected user, a friend registration request for the selected user, and an item trade request for the selected user.

According to an embodiment, the method may further include storing the statistical information.

According to an embodiment, the method may further include updating the statistical information when the certain interaction event occurs between the user and another user.

According to various embodiments of the present disclosure, provided is a game providing apparatus configured to provide information about interaction between users, and the game providing apparatus may include a user input unit; a display, a communication unit, a memory storing a game log and instructions; and at least one processor functionally connected to the user input unit, the display, and the memory and configured to execute the instructions. The at least one processor may be configured to obtain, from the stored game log, statistical information related to a certain interaction event that has occurred between a user and another user; display an interface that displays another user who has had most occurrences of the certain interaction event with the user, based on the statistical information; and display, on the interface, at least one other user in an order from a greatest number of times the certain interaction event has occurred with the user, based on a user input of expanding the interface.

According to an embodiment, the at least one processor may be configured to execute the instructions to extract, from the stored game log, a certain interaction event generated between the user and another user; and obtain information on at least one other user who has had occurrences of the certain interaction event with the user and a number of times the certain interaction event that has occurred with respect to the at least one other user by analyzing the extracted certain interaction event.

According to an embodiment, the certain interaction event may include at least one of a battle between the user and another user, a victory of the user over another user, a defeat of the user by another user, a common group participation of the user and another user, performing of common content of the user and another user, and an item trade between the user and another user.

According to an embodiment, the at least one processor may be further configured to execute the instructions to set, by a user input, whether to expose a user to the interface; and obtain statistical information related to at least one other user who has had occurrences of the certain interaction event with the user among users set to be exposed to the interface.

According to an embodiment, when the user is set not to be exposed to the interface, the statistical information may not be obtained, and another user who has had occurrences of the certain interaction event with the user may not be displayed on the interface.

According to an embodiment, the statistical information may be statistical information related to the certain interaction event that has occurred between the user and another user in a certain period.

According to an embodiment, the at least one processor may be configured to execute the instructions to obtain first statistical information related to the certain interaction event that has occurred between the user and the other user in a first period; obtain second statistical information related to the certain interaction event that has occurred between the user and the other user in a second period; display, on the interface, another user who has had most occurrences of the certain interaction event with the user in the first period, based on the first statistical information; and display, on the interface, another user who has had most occurrences of the certain interaction event with the user in the second period, based on the second statistical information.

According to an embodiment, the at least one processor may be further configured to execute the instructions to obtain, via the interface, a user input of selecting one of the at least one other user; and obtain an interaction request for a selected user based on the user input of selecting one of the at least one other user.

According to an embodiment, the interaction event may include one of a match request for the selected user, a group participation request for the selected user, a friend registration request for the selected user, and an item trade request for the selected user.

According to an embodiment, the memory may further store the statistical information.

According to an embodiment, the at least one processor may be further configured to execute the instructions to update the statistical information stored in the memory when the certain interaction event occurs between the user and another user.

According to various embodiments of the present disclosure, provided is a user terminal configured to use information about interaction between users, and the user terminal may include a user input unit, a display, a communication unit, a memory storing instructions, and at least one processor functionally connected to the user input unit, the display, the communication unit, and the memory and configured to execute the instructions. The at least one processor may be configured to execute the instructions to obtain, from a server, statistical information related to a certain interaction event that has occurred between a user and another user; display an interface that displays another user who has had most occurrences of the certain interaction event with the user, based on the statistical information; and display, on the interface, at least one other user in an order from a greatest number of times the certain interaction event has occurred with the user, based on a user input of expanding the interface.

According to various embodiments of the present disclosure, provided is a computer program stored in a medium to execute a method of providing information about interaction between users in combination with hardware, the computer program including obtaining, from a stored game log, statistical information related to a certain interaction event that has occurred between a user and another user; displaying an interface that displays another user who has had most occurrences of the certain interaction event with the user, based on the statistical information; and displaying at least one other user in an order from a greatest number of times the certain interaction event has occurred with the user, based on a user input of expanding the interface.

According to various embodiments of the present disclosure, provided is a computer-readable recording medium including a program executing a method of providing information about interaction between users on a computer, the computer-readable recording medium including obtaining, from a stored game log, statistical information related to a certain interaction event that has occurred between a user and another user; displaying an interface that displays another user who has had most occurrences of the certain interaction event with the user, based on the statistical information; and displaying at least one other user in an order from a greatest number of times the certain interaction event has occurred with the user, based on a user input of expanding the interface.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 7 is a diagram for explaining an interface that provides information about interaction between users in a certain period, according to an embodiment of the present disclosure;

FIG. 8 is a flowchart of a method of requesting another user for an additional interaction, according to various embodiments of the present disclosure;

DETAILED DESCRIPTION

Figure 1:
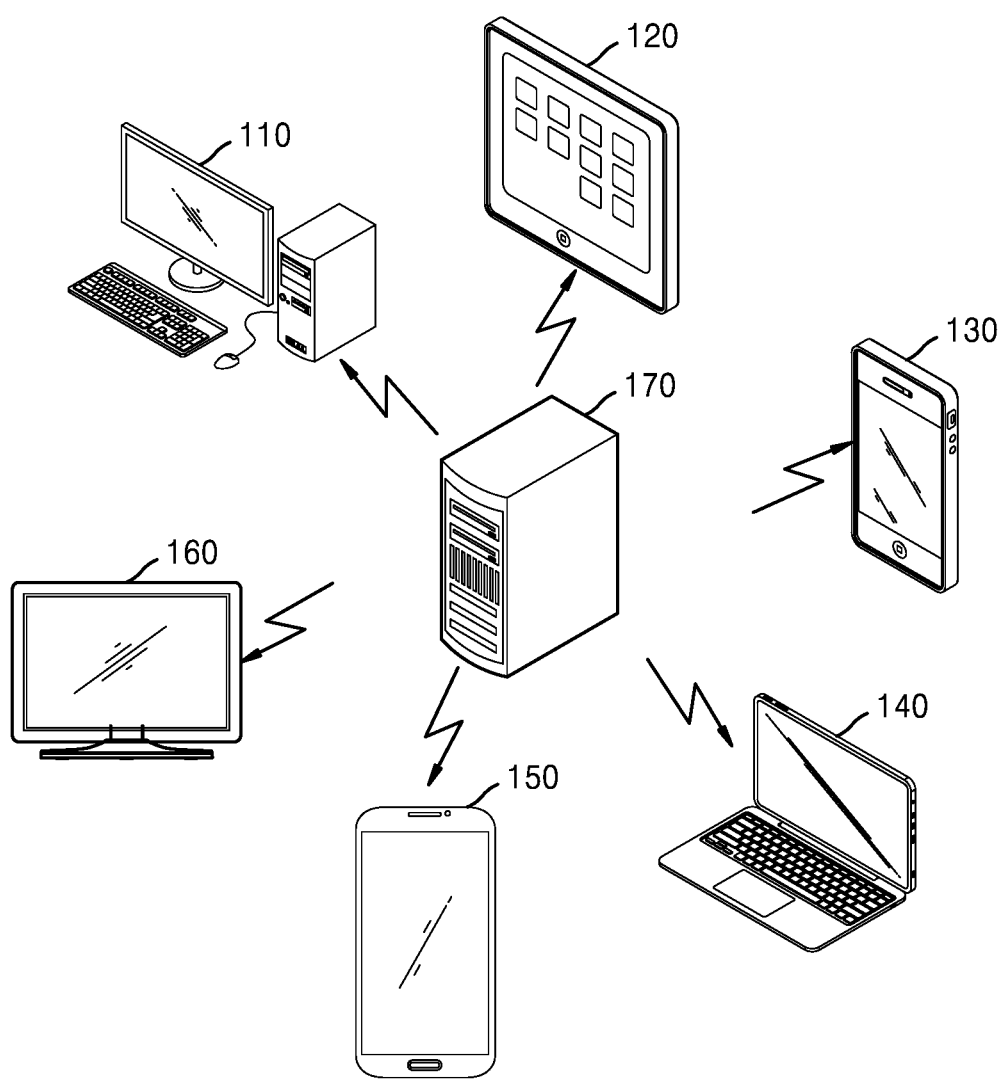
FIG. 1 illustrates a game providing system including a server and a user terminal, according to various embodiments of the present disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, example embodiments according to the present disclosure will be described in detail with reference to content described in the accompanying drawings. In addition, a method of configuring and using an electronic apparatus according to an embodiment of the present disclosure will be described in detail with reference to content described in the accompanying drawings. The same reference numerals or symbols of the respective drawings indicate components or configuration elements that perform substantially the same function.

Although, terms including ordinal numbers such as "first" and "second" may be used to describe various components, but the component should not be limited by the terms. The terms are used only for the purpose of distinguishing one configuration element from another configuration element. For example, a first component may be referred to as a second component without departing from the scope of the present disclosure, and similarly, the second component may also be referred to as the first component. A term "and/or" includes a combination of a plurality of related items or any one of the plurality of related items.

Terms used in the present specification are used to describe embodiments and are not intended to limit and/or restrict the present disclosure. Singular expressions include plural expressions unless the context clearly indicates otherwise. In the present application, it should be understood that terms such as include and have are intended to designate existence of features, numbers, steps, operations, elements, components, or a combination thereof described in the specification, and existence or addition possibility of one or more other features, numbers, steps, operations, configuration elements, components, or a combination thereof is not precluded.

Throughout the specification, when it is described that a portion is connected to another portion, this includes not only a case of being directly connected but also a case of being electrically connected to another element via the other element. In addition, when a part is described to "include" a certain configuration element, which means that the part may further include other configuration elements, except to exclude other configuration elements unless otherwise stated. In addition, terms such as " . . . unit", " . . . portion", and "module" described in the specification mean a unit that processes at least one function or operation, which may be implemented as hardware or software, or as a combination of hardware and software.

In the following description of the present disclosure, a character may refer to a predetermined object that may be controlled by a user in a game.

In the following description of the present disclosure, character information relates to a game character, and may include all types of information on the character, for example, character's ability information such as a level of the character, a grade of the character, a cumulative play time of the character, the amount of money that the character holds, the reputation of the character, an achievement completion rate of the character, and a quest completion rate of the character, and a name of the character, an appearance of the character, or the like, and is not limited thereto.

In the following description of the present disclosure, a user account may mean an account of a user including at least one character. In a game, a user may create a plurality of characters, and the plurality of characters may depend on one user account. The user account is not limited thereto, and there may also be a form of providing a game service through one user account.

In the following description of the present disclosure, user account information may include a user's name, a phone number, an email address, a game use period, age, etc., and is not limited thereto.

In the following description of the present disclosure, a game log may mean data including a record of a user's activity in a game. For example, the game log may include information or data about a record of a user logging in to a game, a record of a user logging out of a game, a record of changing user information, a record of actions performed by a user character in a game, or the like. The record of actions performed by the user character in the game may include records about a movement of the user character, use of skills, acquisition and loss of items, interaction with other characters or objects, and all actions which may be performed in the game, and is not limited thereto.

In the following description of the present disclosure, a mission, a quest, and a request may mean a task provided in a game. In other words, the mission, the quest, and the request may mean an action to achieve a goal given in a game. In addition, one mission may consist of at least one submission (or sub-quest). In addition, the mission may include various types of missions.

In the following description of the present disclosure, a group may mean a set of users in a certain identifiable unit, such as a guild, a party, a circle, a clan, or an attack squad.

In the following description of the present disclosure, a game providing apparatus may be a game server, a user terminal, a game system including the game server and the user terminal, or an independent apparatus.

In the following description of the present disclosure, a server controlling a user terminal may mean that the server makes an output (all output apparatuses of the user terminal, such as screen display, sound output, vibration output, and lamp emission) from the user terminal through communication with the user terminal and that the user terminal provides data for performing a certain operation. The server may also control the output from the user terminal by using the data previously stored in the user terminal, and is not limited thereto.

In the following description of the present disclosure, transmitting and receiving information or data to and from a user (or user account) may include transmitting and receiving information or data to and from a device (or user terminal) corresponding to or linked with the user (or user account).

In the following description of the present disclosure, a user account corresponding to a user terminal may include a user account logged in or accessing a server through the user terminal and a user account in which the user terminal stores information. In addition, a user terminal of a user account may mean a user terminal to which the user account is logged in, in which user account information is stored, or to which the user account is accessed.

In the following description of the present disclosure, a user, a player, a user account, and a gamer may be used interchangeably. It should be understood that, in the present disclosure, a user terminal may refer to a user, a player, a user account, and a gamer, or an apparatus used by them, depending on the context. It should be understood that, in the present disclosure, a user, a player, a user account, and a gamer may indicate an avatar or a character operated by them or a device used by them, depending on the context.

FIG. 1 illustrates a game providing system 100 including a server and a user terminal, according to various embodiments of the present disclosure.

The game providing system 100 of the present disclosure may include a server 170 and at least one user terminal 110 to 160. The server 170 may provide various online activities through a network. The server 170 may simultaneously provide the online activities to the at least one user terminal 110 to 160.

According to an embodiment of the present disclosure, the server 170 may include a single server, a group of servers, a cloud server, or the like, and is not limited thereto. The server 170 may provide various online activities and include a database that stores data for the online activities. In addition, the server 170 may also include a payment server that generates and processes payment events. As described above, the server 170 may be a game providing apparatus.

According to an embodiment of the present disclosure, a network may mean a connection established (or formed) by using all communication methods, and may mean a communication network connected through all communication methods for transmitting and receiving data between a terminal and a terminal or between a terminal and a server.

All the communication methods may include all communication methods such as communication through a certain communication standard, a certain frequency band, a certain protocol, or a certain channel. For example, all the communication methods may include Bluetooth, Bluetooth low energy (BLE), Wi-Fi, Zigbee, 3rd generation (3G), long term evolution (LTE), a communication method through ultrasound, or the like, and may include all of short-distance communication, long-distance communication, wireless communication, and wired communication. However, the present disclosure is not limited thereto.

According to an embodiment of the present disclosure, the short-distance communication method may mean a communication method in which communication is possible only when a device (terminal or server) performing communication is within a certain range, and may include, for example, Bluetooth, near field communication (NFC), or the like. The long-distance communication method may mean a communication method in which a device performing communication may communicate regardless of a distance. For example, the long-distance communication method may mean a method in which two devices performing communication through a repeater, such as an access point (AP), may communicate even when being spaced apart by a certain distance, and may include a communication method using a cellular network (3G, LTE) such as SMS and telephone. However, the present disclosure is not limited thereto. Receiving online activities by using a network may mean that communication between a server and a terminal may be performed through all communication methods.

Throughout the disclosure, at least one of the user terminals 110 to 160 may include a personal computer 110, a tablet 120, a cellular phone 130, a notebook 140, a smartphone 150, a television (TV) 160, as well as various electronic devices, such as, a personal digital assistant (PDA), a portable multimedia player (PMP), a navigation device, an MP3 player, a digital camera, a refrigerator, a washing machine, and a vacuum cleaner, and is not limited thereto. As described above, the at least one of the user terminals 110 to 160 may be a game providing apparatus.

According to an embodiment of the present disclosure, the online activities may include online games, portal services, and social network service (SNS), and are not limited thereto. In addition, the online games may include various genres such as sports, massive multiplayer online role playing game (MMORPG), aeon of strife (AOS), first-person shooter (FPS), trading card game (TCG), collectable card game (CCG), or the like. In addition, an online game may be a game of a user-to-user match method, or may be a game of a user-to-computer (for example, artificial intelligence) match method. Also, the online game may also be a game of construction or decoration instead of a match. The online game is not limited thereto, and there is no limitation to the form of the online game.

According to various embodiments of the present disclosure, a server may store a game log. The server 170 may analyze the stored game log to obtain statistical information related to an occurrence of a certain interaction event between a user and another user. According to another embodiment of the present disclosure, the server 170 may store the statistical information related to an occurrence of a certain interaction event between a user and another user. When a certain interaction event occurs between a user and another user, the server 170 may update the stored statistical information.

According to various embodiments of the present disclosure, the server 170 may provide the statistical information to the user terminals 110 to 160. However, the present disclosure is not limited thereto, and for example, the user terminals 110 and 160 may also obtain the statistical information by using pre-stored information without communication with the server 170.

According to various embodiments of the present disclosure, the user terminals 110 to 160 may display an interaction information interface that displays another user who has had the most occurrences of a certain interaction event with the user, based on the statistical information. The user terminals 110 to 160 may display at least one other user on the interaction information interface in an order from a greatest number of times the certain interaction event has occurred with the user, based on a user input for expanding the interface. This will be described in more detail below.

According to an embodiment of the present disclosure, the user terminals 110 to 160 may obtain a user input of selecting one of the at least one other user through the interaction information interface. The user terminals 110 to 160 may transmit an interaction request for the selected user to the server 170. The server 170 may process the obtained interaction request and transmit a processing result to the user terminals 110 to 160.

Figure 2:
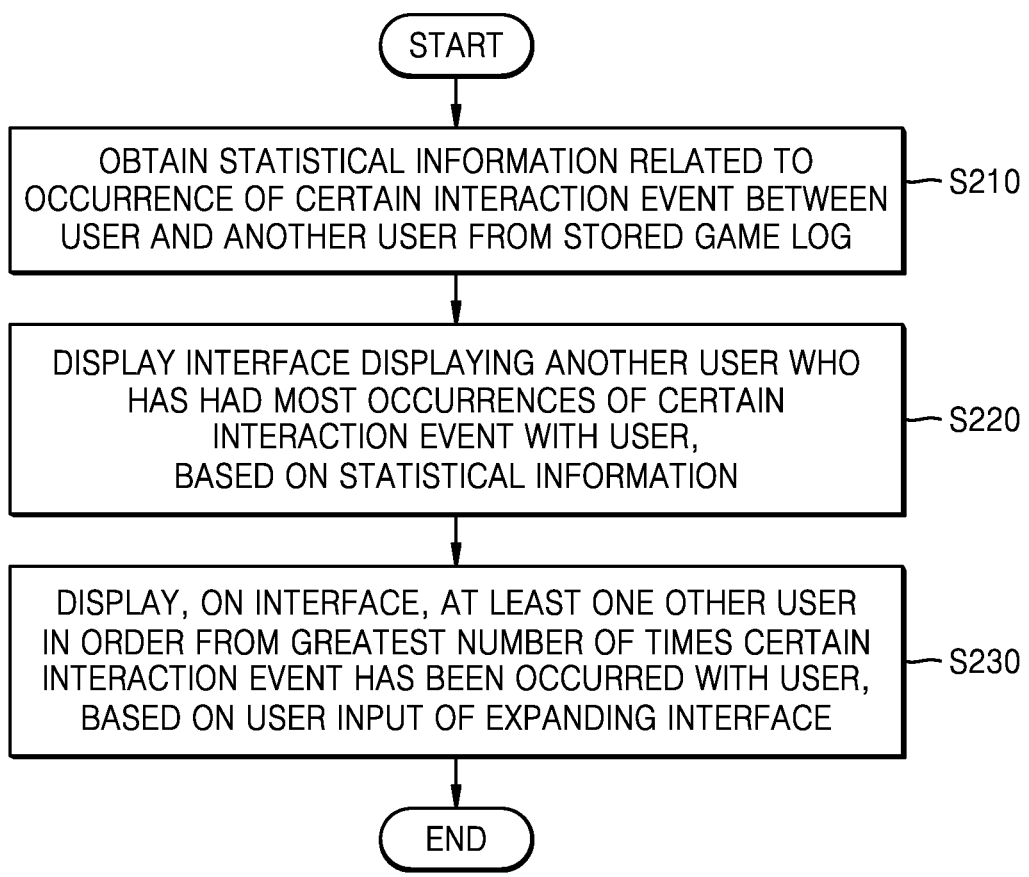
FIG. 2 is a flowchart of a method of providing information about interaction between users, according to various embodiments of the present disclosure.

FIG. 2 is a flowchart of a method of providing information about interaction between users, according to various embodiments of the present disclosure. These operations may be performed by the user terminals 110 to 160 and the server 170 shown in FIG. 1, a game providing apparatus 1000 or a processor 1010 of the game providing apparatus 1000 shown in FIG. 10.

Referring to FIG. 2, in operation S210, a game providing apparatus may obtain statistical information related to an occurrence of a certain interaction event between a user and another user from a stored game log. Hereinafter, the user and the other user may mean user accounts, or may mean user characters (player characters) belonging to the user accounts.

In an embodiment, the game providing apparatus may extract a certain interaction event log generated between the user and the other user from the stored game log. The game providing apparatus may analyze the extracted certain interaction event log to obtain statistical information including information on at least one other user who has had an occurrence of a certain interaction event with the user and a number of times the certain interaction event occurred with respect to the at least one other user. In an embodiment, the statistical information may further include other statistical parameters related to an occurred interaction event, for example, the occurrence time of the interaction event, the occurrence effect of the interaction event, or the like.

In an embodiment, the certain interaction event may be a match between the user and the other user. The match may be any game content in which users compete in hostile positions to decide whether to win or lose, for example, battles, duels, wars, matches, or the like. The game providing apparatus may extract logs related to a match performed by the user from the stored game log to obtain information related to an opponent of the match and count the number of matches between the user and the opponent. In an embodiment, when a plurality of match contents exist in a game, a certain interaction event may be limited to a particular match content. In other words, the game providing apparatus may obtain the statistical information by extracting and analyzing only the logs related to the particular match content performed by the user from the game log. For example, the game providing apparatus may only obtain statistical information related to a 1:1 match between the user and another user, or may only obtain statistical information related to a many-to-many match between a group to which the user belongs and a group to which another user belongs.

In an embodiment, the certain interaction event may be an event in which the user won over another user or an event in which the user was defeated by another user. The game providing apparatus may extract logs in which the user won or lost from the stored game log to obtain information related to an opponent that the user won or lost and count the number of wins or defeats with respect to the opponent. In an embodiment, the win or defeat may also mean only a result of the particular match content. In other words, when the game has match content, the game providing apparatus may obtain the statistical information by extracting and analyzing only logs of wins or defeats related to the particular match content from the game log.

In an embodiment, the certain interaction event may be an event in which the user participated in a group common with another user. The game providing apparatus may extract a log in which the user participated in a group from the stored game log to obtain information of another user who participated in the same group and count the number of times that the user and the other user participated in the same group.

In an embodiment, the certain interaction event may be an event in which the user and another user performed a common mission together. The game providing apparatus may extract a log in which the user performed a mission and a log in which another character performed the same mission at the same time from the stored game log to obtain information of the other character who performed the same mission as the user and count the number of times the user and another user performed the same mission together. In an embodiment, when there are various types of missions in the game, the certain interaction event may be limited to a particular type of mission. In other words, the game providing apparatus may obtain the statistical information by extracting and analyzing only logs related to the particular type of mission performed by the user from the game log. For example, the game providing apparatus may obtain only statistical information related to a quest performed by the user and another user together, or may obtain only statistical information related to a stage cleared by the user and the other user together.

In an embodiment, the certain interaction event may be an item trade performed between the user and another user. The game providing apparatus may extract logs related to an item trade performed by the user from the stored game log to obtain information about a counterparty of the trade and count the number of trade between the user and the counterparty or a total value that the user and the counterparty traded.

In an embodiment, the certain interaction event may be an event in which the user attacked another user. The game providing apparatus may extract a log in which the user attacked another user from the stored game log to count the number of times the user attacked the other user or a total amount of damage caused. In an embodiment, the certain interaction event may be an event in which the user was attacked by another user. The game providing apparatus may extract a log in which the user was attacked by another user from the stored game log to count the number of times the user was attacked by the other user or a total amount of damage suffered.

In an embodiment, the certain interaction event may be an event in which the user healed another user. The game providing apparatus may extract a log in which the user healed another user from the stored game log to count the number of times the user healed the other user or a total amount of healing. In an embodiment, the certain interaction event may be an event in which the user was healed by another user. The game providing apparatus may extract a log in which the user was healed by another user from the stored game log to count the number of times the user was healed by the other user or a total amount of healing.

However, the certain interaction event is not limited thereto, and may include any interaction events between users recorded in a game log.

In an embodiment, a game log may be stored in a server. The server may obtain statistical information related to an occurrence of a certain interaction event between a user and another user from the stored game log, and transmit the obtained statistical information to a user terminal. In another embodiment, a game log may be stored in the user terminal. The user terminal may obtain statistical information related to an occurrence of a certain interaction event between a user and another user from the stored game log without communication with the server.

In an embodiment, the game providing apparatus may store the obtained statistical information. In an embodiment, when a certain interaction event occurs between a user and another user, the game providing apparatus may update the stored statistical information. For example, when a match interaction event occurs between a user and another user 'User A', the game providing apparatus may check whether there is information related to the 'User A' in a list of other users who have had a match with the user included in the statistical information. When there is not information related to the 'User A', the game providing apparatus may add the 'User A' to the list of other users who have had a match with the user, and when there is information related to the 'User A', the game providing apparatus may add 1 to the number of matches with the 'User A' in the statistical information. In addition, other statistical parameters related to the occurred match interaction event, for example, start and end times of the match, a result or effect of the match, or the like, may also be stored as the statistical information. When the statistical information is stored, the game providing apparatus may directly obtain the statistical information related to a certain interaction event without analyzing the stored game log.

In operation S220, the game providing apparatus may display an interaction information interface that displays another user who has had the most occurrences of the certain interaction event with the user, based on the obtained statistical information.

For example, the game providing apparatus may display the interaction information interface that displays at least one of another user who has had the most matches with the user, another user that the user has beat the most, another user who has defeated the user the most, another user who has participated in the same group with the user the most, another user who has performed the same content with the user the most, and another user who has traded with the user the most, based on the statistical information. However, the interaction event that may be displayed on the interaction information interface is not limited thereto. In an embodiment, the game providing apparatus may display other users respectively corresponding to a plurality of interaction events on the interaction information interface.

In an embodiment, the game providing apparatus may display information of another user on the interaction information interface. In an embodiment, the information of another user displayed on the interaction information interface may include a name of a user account or a user character, as well as the appearance, level, grade, job (class), affiliated group, game play time, reputation, or other user account information or user character information. In an embodiment, the game providing apparatus may additionally display, on the interaction information interface, the number of times a certain interaction event occurred between the user and another user together with the information of another user.

In another embodiment, another user to be displayed on the interaction information interface may be determined by statistical parameters other than the number of times a certain interaction event has occurred with the user. For example, the game providing apparatus may display, on the interaction information interface, another user who has had an occurrence of a certain interaction event with the user most recently. As another example, the game providing apparatus may display, on the interaction information interface, a user with the highest level from among other users who have had an occurrence of a certain interaction event with the user. As another example, the game providing apparatus may display, on the interaction information interface, a user having the longest interaction time from among other users who have had an occurrence of a certain interaction event with the user. As another example, the game providing apparatus may display, on the interaction information interface, a user having the greatest effect generated by an interaction from among other users who have had an occurrence of a certain interaction event with the user. The effect generated by the interaction may include various parameters such as a movement amount, a damage amount, a healing amount, an acquired score, a traded value, or the like, according to a type of an interaction event. However, the present disclosure is not limited thereto. In an embodiment, the game providing apparatus may additionally display, on the interaction information interface, statistical parameters corresponding to another user displayed on the interaction information interface.

In operation S230, the game providing apparatus may display, on an expanded interaction information interface, at least one other user in an order from a greatest number of times a certain interaction event has occurred with the user, based on a user input of expanding the interaction information interface. That is, the interaction information interface before expansion may display only one user from among other users who have had an occurrence of a certain interaction event with the user, and on the contrary, the expanded interaction information interface may display a plurality of users who have had an occurrence of a certain interaction event with the user. For example, another user who has had the most matches with the user may be displayed on the interaction information interface before expansion, and other users who have had a match with the user may be displayed on the expanded interaction information interface in an order from the greatest number of matches.

In an embodiment, the interaction information interface may include an expansion interface which provides a function of expanding the interaction information interface. The game providing apparatus may respond to obtaining of a user input through the expansion interface to expand the interaction information interface. In an embodiment, the interaction information interface may include a plurality of expansion interfaces respectively corresponding to a plurality of interaction events. In this case, the game providing apparatus may respond to obtaining of a user input through an expansion interface corresponding to a particular interaction event to expand an interface corresponding to an interaction event to display at least one other user corresponding to the interaction event. A method of expanding an interface corresponding to an interaction event will be described in detail below with reference to FIGS. 3 to 5.

In an embodiment, the number of at least one other user which may be displayed on an interface corresponding to an expanded interaction event may be limited. For example, when the number of at least one other user which may be displayed on an expanded interface is set to a maximum of N, and when the number of other users who have had an occurrence of a certain interaction event with the user is greater than N, only the top N other users may be displayed on the expanded interface. In another embodiment, the expanded interface may display all other users who have had an occurrence of a certain interaction event with the user.

In an embodiment, the game providing apparatus may display, on the expanded interaction information interface, information of each of the at least one other user. In an embodiment, the information of another user displayed on the expanded interaction information interface may include a user account or a name of a user character, as well as the appearance, level, grade, job (class), affiliated group, game play time, reputation, or other user account information or user character information. In an embodiment, the game providing apparatus may additionally display, on the expanded interaction information interface, the number of times a certain interaction event has occurred between the user and another user together with the information of the at least one other user.

In an embodiment, the at least one other user displayed on the expanded interaction information interface may be arranged by statistical parameters other than the number of times a certain interaction event has occurred with the user. For example, the game providing apparatus may display, on the expanded interaction information interface, the at least one other user in an order from the most recent interaction with the user. As another example, the game providing apparatus may display, on the expanded interaction information interface, the at least one other user in an order from the highest level. As another example, the game providing apparatus may display, on the expanded interaction information interface, the at least one other user in an order from the longest interaction time with the user. As another example, the game providing apparatus may display, on the expanded interaction information interface, the at least one other user in an order from the greatest effect generated by the interaction. The effect generated by the interaction may include various parameters such as a movement amount, a damage amount, a healing amount, an acquired score, a traded value, or the like, according to a type of an interaction event. However, the present disclosure is not limited thereto. In an embodiment, the game providing apparatus may additionally display, on the interaction information interface, statistical parameters corresponding to each of the at least one other user displayed on the expanded interaction information interface.

In an embodiment, the game providing apparatus may reduce and display the interaction information interface to a state before the expansion based on a user input of reducing the expanded interaction information interface.

Figure 3:
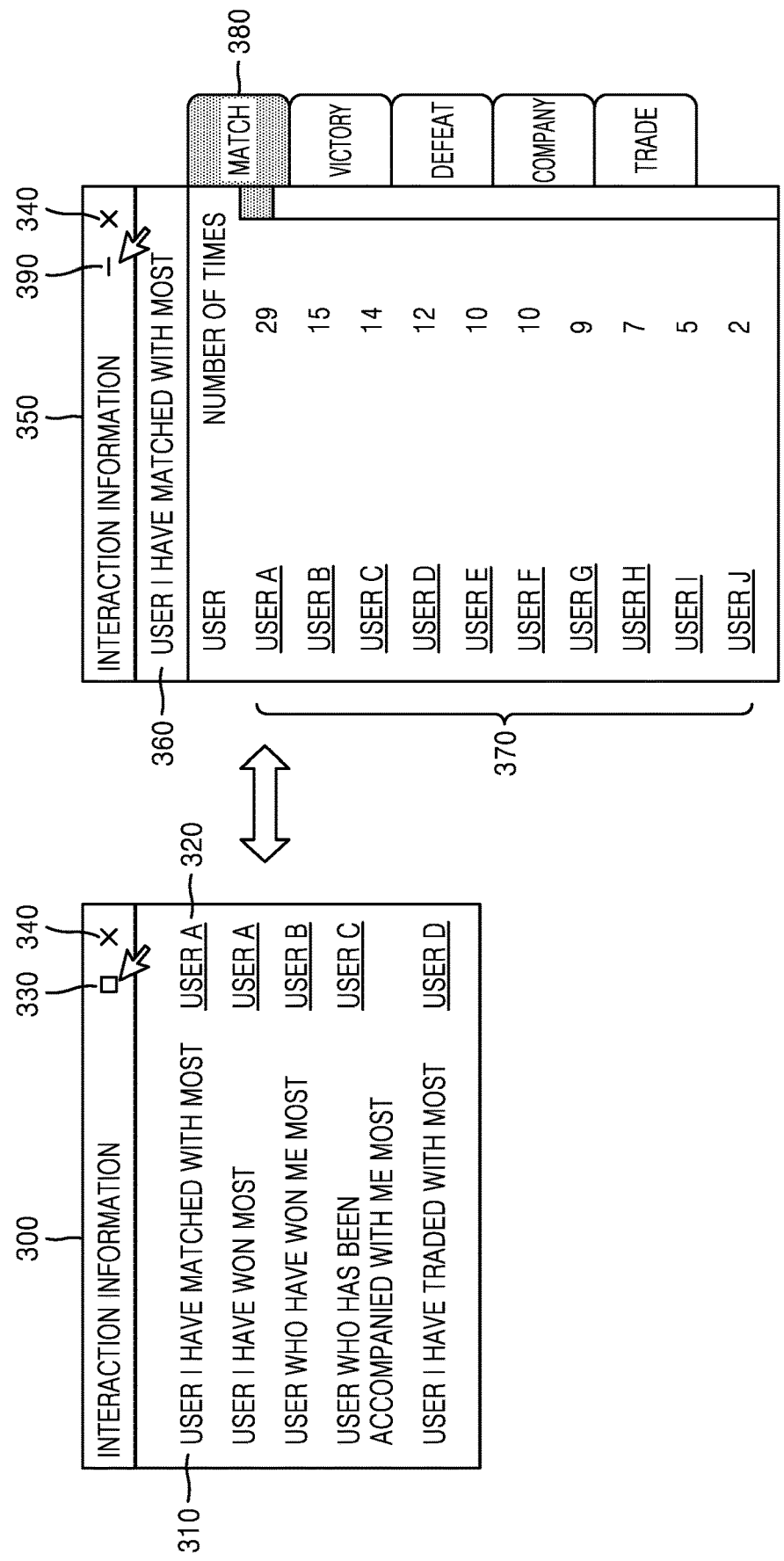
FIG. 3 is a diagram for explaining an interface that provides information about interaction between users, according to an embodiment of the present disclosure.

FIG. 3 is a diagram for explaining an interface that provides information about interaction between users, according to an embodiment of the present disclosure.

FIG. 3 shows an example of an interaction information interface 300 and an expanded interaction information interface 350 which are displayed on a user terminal. The interaction information interface 300 may be an interface providing information related to an occurrence of an interaction between users, particularly, statistical information related to an occurrence of a certain interaction event between a user and another user. The expanded interaction information interface 350 may be a form in which the interaction information interface 300 is modified by a user input. The expanded interaction information interface 350 may be an interface providing the statistical information in more detail.

According to various embodiments of the present disclosure, the interaction information interface 300 may include at least one interaction event information interface 310, at least one user information interface 320 corresponding thereto, an expansion interface 330, and a close interface 340. The interaction information interface 300 is not limited to the example of FIG. 3, and more or less components than those shown in FIG. 3 may be included in the interaction information interface 300.

According to various embodiments of the present disclosure, the interaction event information interface 310 may be an interface indicating how statistical information displayed on the interaction information interface 300 is related to which interaction event. That is, the interaction event information interface 310 may indicate a type of a certain interaction event occurred between a user and another user and a criterion of determination of another user displayed on the user information interface 320.

In an embodiment, the certain interaction event displayed on the interaction event information interface 310 may include at least one of a match between the user and another user, victory over another user of the user, defeat of the user by another user, participation in a common group of the user and another user, performing of common content between the user and another user, and an item trade between the user and another user. However, the present disclosure is not limited thereto, and the certain interaction event displayed on the interaction event information interface 310 may include any interaction event between the user and another user recorded from a game log.

In an embodiment, the interaction event information interface 310 may indicate that a user having the greatest number of times a certain interaction event has occurred with the user is displayed on the user information interface 320. In another embodiment, the interaction event information interface 310 may indicate that a user determined by a statistical parameter other than the number of times an interaction has occurred is displayed on the user information interface 320.

According to various embodiments of the present disclosure, the user information interface 320 may be an interface that displays information of another user designated by the interaction event information interface 310. That is, the user information interface 320 may display information of a particular user who has had an occurrence of a certain interaction event indicated by the interaction event information interface 310 with the user. In an embodiment, the user information interface 320 may display a user having the greatest number of times a certain interaction event occurred with the user. In another embodiment, another user to be displayed on the user information interface 320 may be determined by other statistical parameters.

In an embodiment, the information of another user displayed on the user information interface 320 may include a name of a user account or a user character, as well as the appearance, level, grade, job (class), affiliated group, game play time, reputation, or other user account information or user character information. In an embodiment, the number of times a certain interaction event has occurred between the user and another user may be displayed on the user information interface 320 together with the information of the other user.

In an embodiment, the user information interface 320 may provide a function of displaying information related to another corresponding user in more detail. For example, a user information interface in which the information related to another user is displayed in more detail may be displayed based on a user input of clicking or hovering the other user displayed on the user information interface 320. In an embodiment, the user information interface 320 may provide a function of requesting a corresponding user for an interaction. This will be described in more detail below with reference to FIGS. 8 and 9.

In various embodiments, the interaction information interface 300 may include a plurality of interaction event information interfaces 310 and user information interfaces 320 corresponding thereto.

According to an embodiment of the present disclosure, the expansion interface 330 may be an interface that provides a function of expanding the interaction information interface 300. For example, when a user input with respect to the expansion interface 330 is obtained, the interaction information interface 300 may be changed to the expanded interaction information interface 350. In addition, the close interface 340 may be an interface that provides a function of removing the interaction information interface 300 from a screen. However, the present disclosure is not limited thereto.

According to various embodiments of the present disclosure, the expanded interaction information interface 350 may include an interaction event information interface 360, an expanded user information interface 370 corresponding thereto, at least one interaction event selection interface 380, a reduction interface 390, and the close interface 340. The expanded interaction information interface 350 is not limited to the example of FIG. 3, and more or less components than those shown in FIG. 3 may be included in the expanded interaction information interface 350.

According to various embodiments of the present disclosure, the interaction event information interface 360 may be an interface indicating how statistical information displayed on the expanded interaction information interface 350 is related to a certain interaction event. The interaction event information interface 360 may indicate a type of a certain interaction event occurred between a user and another user and a criterion of determination of at least one other user displayed on the expanded user information interface 370. Because the interaction event information interface 360 may have a 1:1 correspondence with the interaction event information interface 310 of the interaction information interface 300 and provide the same function, a redundant description thereof will be omitted.

In an embodiment, the interaction event information interface 360 may be an interface indicating an interaction event currently selected from among at least one interface event corresponding to the at least one interaction event selection interface 380.

According to various embodiments of the present disclosure, the expanded user information interface 370 may be an interface that displays information of at least one other user designated by the interaction event information interface 360. That is, the expanded user information interface 370 may display information of at least one other user who have had an occurrence of a certain interaction event indicated by the interaction event information interface 360 with the user. In an embodiment, the expanded user information interface 370 may display the information of at least one other user in an order from the greatest number of times a certain interaction event has occurred with the user.

The expanded user information interface 370 may be an expansion of the user information interface 320 displayed on the interaction information interface 300 before expansion. The expanded user information interface 370 may display information of the at least one other user including a user who was displayed on the user information interface 320. For example, another user who has had the most matches with the user may be displayed on the user information interface 320 before expansion, and other users who have had a match with the user may be displayed on the expanded user information interface 370 in an order from the greatest number of matches.

In an embodiment, the number at least one other user to be displayed on the expanded user information interface 370 may be limited. For example, the expanded user information interface 370 may display the top N users who have had interacted with the user the most. In another embodiment, the expanded user information interface 370 may display all other users who have had a certain interaction event with the user.

In an embodiment, information of each of the at least one other user may be displayed on the expanded user information interface 370. The information of another user displayed on the expanded user information interface 370 may include a name of a user account or a user character, as well as the appearance, level, grade, job (class), affiliated group, game play time, reputation, or other user account information or user character information. In an embodiment, the number of times a certain interaction event has occurred between the user and another user may be displayed on the expanded user information interface 370 together with the information of the other user.

In an embodiment, the at least one other user displayed on the expanded user information interface 370 may be arranged by statistical parameters other than the number of times a certain interaction event occurred with the user. In an embodiment, the expanded user information interface 370 may additionally display statistical parameters corresponding to each of the displayed at least one other user.

In an embodiment, the expanded user information interface 370 may provide a function of displaying information related to the at least one other user in more detail, similarly to the user information interface 320. For example, a user information interface on which information related to a selected user is displayed in more detail may be displayed based on a user input of clicking or hovering one of the at least one other user displayed on the expanded user information interface 370.

In an embodiment, the expanded user information interface 370 may provide a function of requesting the selected user for an interaction, similarly to the user information interface 320. This will be described in more detail below with reference to FIGS. 8 and 9.

According to various embodiments of the present disclosure, the interaction event selection interface 380 may provide a function of selecting statistical information to be displayed on the expanded interaction information interface 350. For example, statistical information related to a certain interaction event corresponding to a selected interaction event selection interface 380 may be displayed on the expanded interaction information interface 350 based on a user input of selecting one of the at least one interaction event selection interface 380. That is, the interaction event information interface 360 and the expanded user information interface 370 corresponding to the selected interaction event selection interface 380 may be displayed.

The interaction event selection interface 380 may have 1:1 correspondence to the interaction event information interface 310 of the interaction information interface 300 before expansion. For example, the interaction information interface 300 before expansion includes five interaction event information interfaces 310, and the expanded interaction information interface 350 may include five interaction event selection interfaces 380 respectively corresponding to the five interaction event information interfaces 310.

According to various embodiments of the present disclosure, the reduction interface 390 may be an interface that provides a function of reducing the expanded interaction information interface 350. For example, when a user input with respect to the reduction interface 390 is obtained, the expanded interaction information interface 350 may be changed to the interaction information interface 300 before expansion. In addition, the close interface 340 may be an interface that provides a function of removing the expanded interaction information interface 350 from a screen. However, the present disclosure is not limited thereto.

Figure 4:
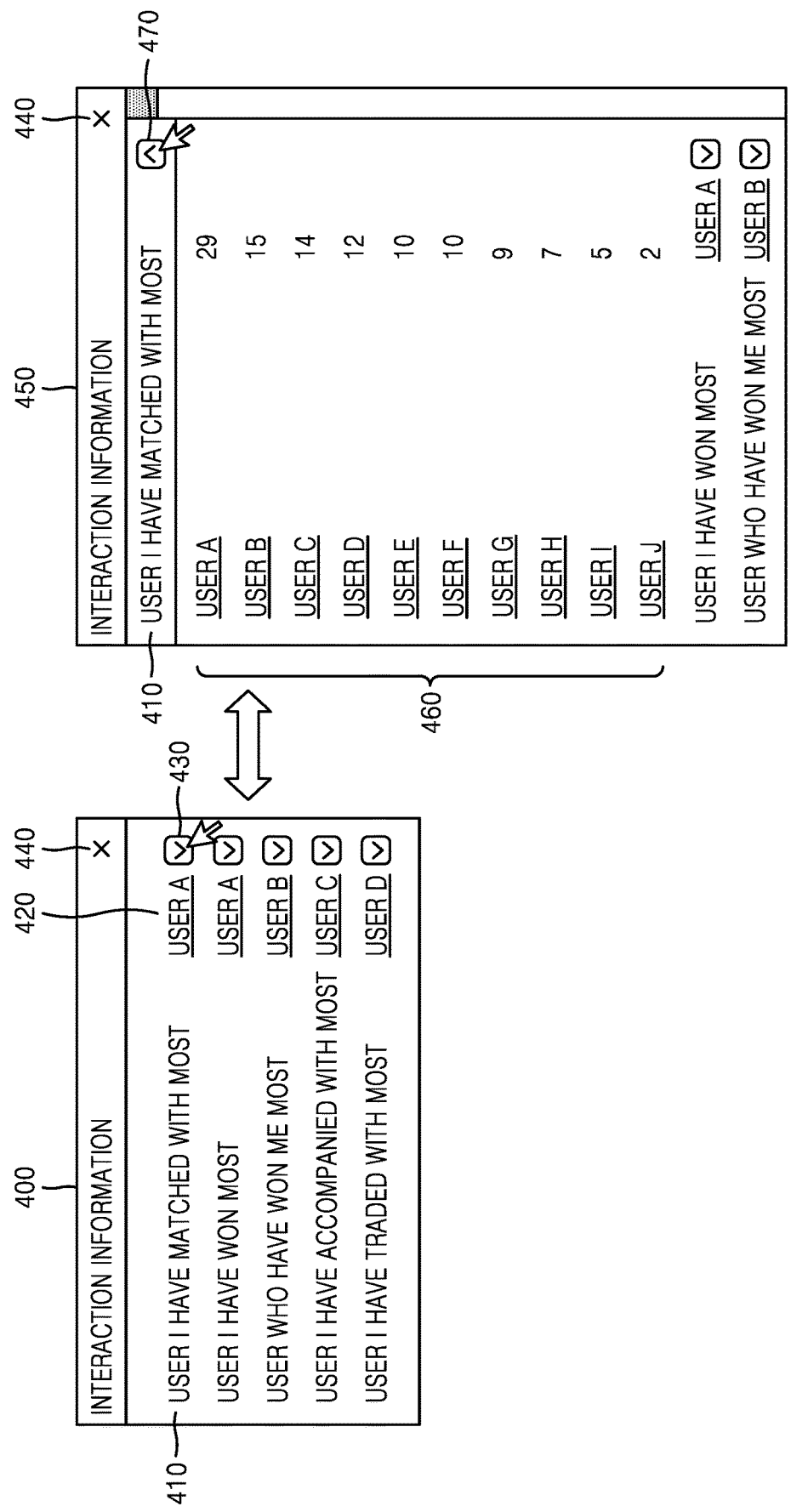
FIG. 4 is a diagram for explaining an interface that provides information about interaction between users, according to another embodiment of the present disclosure.

FIG. 4 is a diagram for explaining an interface that provides information about interaction between users, according to another embodiment of the present disclosure.

FIG. 4 shows an example of an interaction information interface 400 and an expanded interaction information interface 450, which are displayed on a user terminal.

According to various embodiments of the present disclosure, the interaction information interface 400 may include at least one interaction event information interface 410, at least one user information interface 420 and at least one expansion interface 430 corresponding thereto, and a close interface 440. According to various embodiments of the present disclosure, the expanded interaction information interface 450 may include the interaction event information interface 410, an expanded user information interface 460 and at least one reduction interface 470 corresponding thereto, and the close interface 440. The interaction information interface 400 and the expanded interaction information interface 450 are not limited to the example of FIG. 4, and more or less components than those shown in FIG. 4 may be included in the interaction information interface 400 and the expanded interaction information interface 450. For example, a function of the expansion interface 430 may be merged into a corresponding interaction event information interface 410 or user information interface 420. For example, a function of the reduction interface 470 may be merged into a corresponding interaction event information interface 410.

The interaction event information interface 410, the user information interface 420, the close interface 440, and the expanded user information interface 460 may respectively correspond to the interaction event information interface 310, the user information interface 320, the close interface 340, and the expanded user information interface 370 of FIG. 3. Accordingly, description already given with reference to FIG. 3 is omitted.

According to an embodiment of the present disclosure, the expansion interface 430 may be an interface that provides a function of expanding a portion of the interaction information interface 400. The expansion interface 430 may have 1:1 correspondence to the interaction event information interface 410 and the user information interface 420. When a user input with respect to the expansion interface 430 is obtained, the user information interface 420 corresponding to the expansion interface 430 may be changed to the expanded user information interface 460. As the user information interface 420 is changed to the expanded user information interface 460, the expansion interface 430 may be changed to the reduction interface 470.

According to an embodiment of the present disclosure, the reduction interface 470 may be an interface that provides a function of reducing a portion of the expanded interaction information interface 450. When a user input with respect to the reduction interface 470 is obtained, the expanded user information interface 460 corresponding the reduction interface 470 may be changed to the user information interface 420 before expansion. As the expanded user information interface 460 is changed to the user information interface 420, the reduction interface 470 may be changed to the expansion interface 430.

Figure 5:
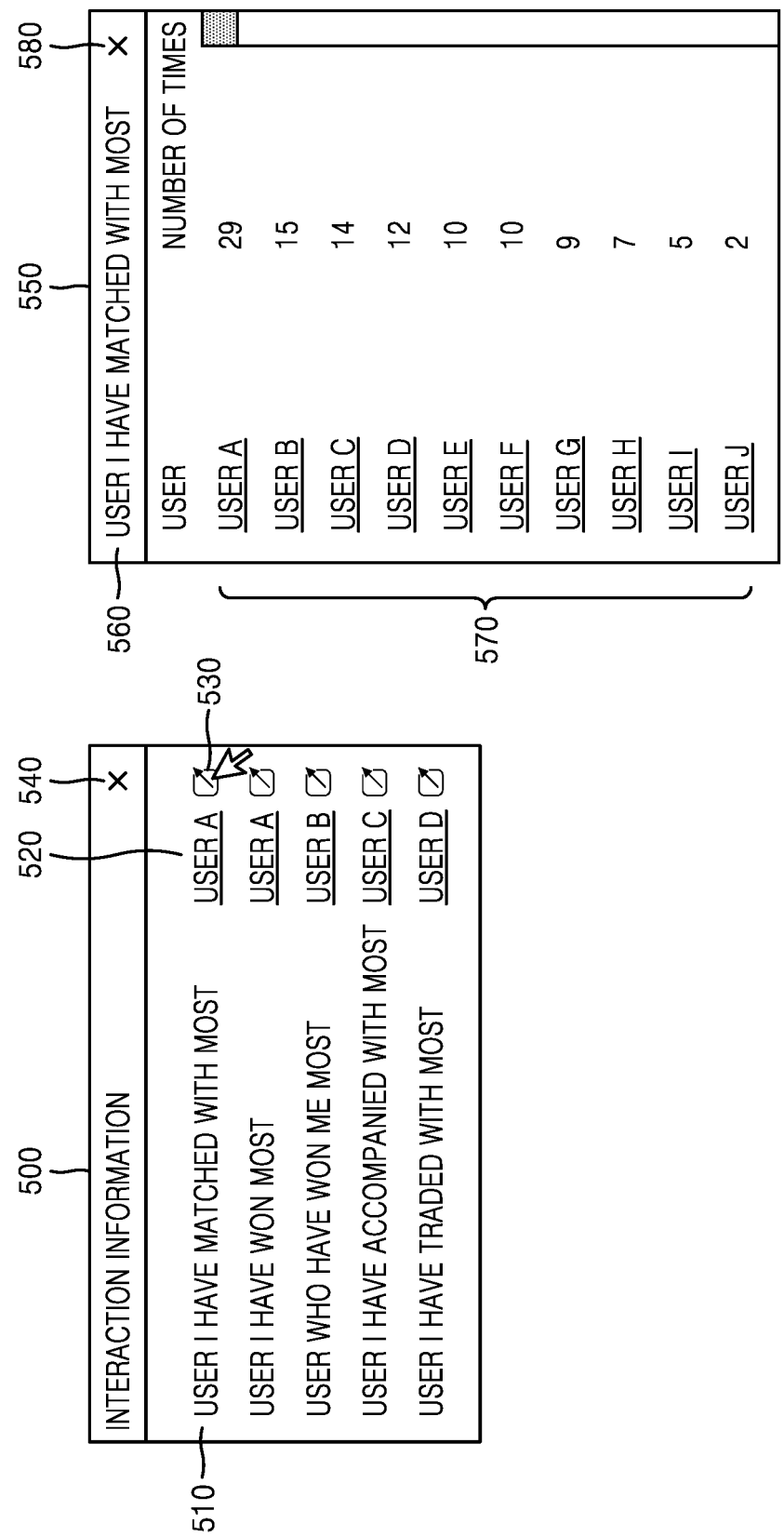
FIG. 5 is a diagram for explaining an interface that provides information about interaction between users, according to another embodiment of the present disclosure.

FIG. 5 is a diagram for explaining an interface that provides information about interaction between users, according to another embodiment of the present disclosure.

FIG. 5 shows another example of an interaction information interface 500 and an expanded interaction information interface 550, which are displayed on a user terminal.

According to various embodiments of the present disclosure, the interaction information interface 500 may include at least one interaction event information interface 510, at least one user information interface 520 and at least one expansion interface 530 corresponding thereto, and a close interface 540. The interaction information interface 500 is not limited to the example of FIG. 5, and more or less components than those shown in FIG. 5 may be included in the interaction information interface 500. For example, a function of the expansion interface 530 may be merged into a corresponding interaction event information interface 510 or user information interface 520.

The interaction event information interface 510 and the user information interface 520 may respectively correspond to the interaction event information interface 310 and the user information interface 320 of FIG. 3. Accordingly, description already given with reference to FIG. 3 is omitted.

According to an embodiment of the present disclosure, the expansion interface 530 may be an interface that provides a function of expanding the interaction information interface 500. The expansion interface 530 may have 1:1 correspondence to the interaction event information interface 510 and the user information interface 520. Unlike the embodiment shown in FIG. 4, when a user input with respect to the expansion interface 530 is obtained, the expanded interaction information interface 550 displaying statistical information related to a certain interaction event corresponding to the expansion interface 530 may be separately displayed while the interaction information interface 500 is maintained in an original state.

In an embodiment, when the interaction information interface 500 includes a plurality of interaction event information interfaces 510, a plurality of expansion interfaces 530 respectively corresponding thereto may provide a function of respectively displaying different expanded interaction information interfaces 550. In this case, a plurality of expanded interaction information interfaces 550 may be simultaneously displayed.

According to an embodiment of the present disclosure, the close interface 540 may be an interface that provides a function of removing the interaction information interface 500 from a screen. In an embodiment, even when the interaction information interface 500 is removed from a screen by a user input with respect to the close interface 540, the expanded interaction information interface 550 displayed may not be removed from the screen. In another embodiment, when the interaction information interface 500 is removed from the screen, all expanded interaction information interfaces 550 displayed may be displayed from the screen.

According to various embodiments of the present disclosure, the expanded interaction information interface 550 may include an interaction event information interface 560, an expanded user interface 570 corresponding thereto, and a close interface 580. The expanded interaction information interface 550 is not limited to the example of FIG. 5, and more or less components than those shown in FIG. 5 may be included in the expanded interaction information interface 550.

The interaction event information interface 560 and the expanded user interface 570 may respectively correspond to the interaction event information interface 360 and the expanded user information interface 370 of FIG. 3. Accordingly, description already given with reference to FIG. 3 is omitted.

According to an embodiment of the present disclosure, the close interface 580 may be an interface that provides a function of removing the expanded interaction information interface 550 from a screen. In an embodiment, even when the expanded interaction information interface 550 is removed from the screen by a user input with respect to the close interface 580, the interaction information interface 500 and other expanded interaction information interfaces 550 may not be removed from the screen.

A user may easily check other users who have a relationship with him/her via a game play through the interface providing information related to an interaction between users. Even when the user does not manually register a friend or join a guild, the user may actively receive a list of other users who have been connected with him/her, and in particular, may easily check other users who have frequent interactions with the user according to a type of interaction. Accordingly, a formation path of a network between users may be diversified, and a quantitative and qualitative improvement of a user community may be induced.

Figure 6:
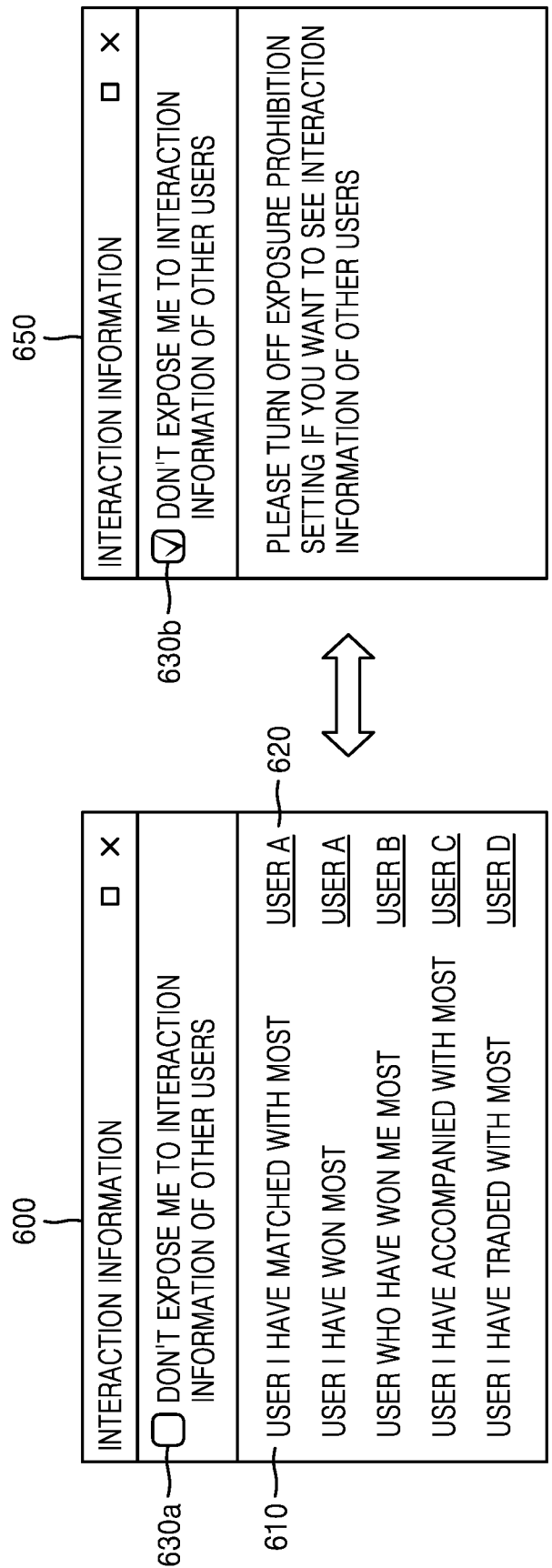
FIG. 6 is a diagram for explaining a method of setting whether to expose information about interaction between users, according to an embodiment of the present disclosure.

FIG. 6 is a diagram for explaining a method of setting whether to expose information about interaction between users, according to an embodiment of the present disclosure.

Some users may not want their information to be exposed regardless of their intentions to other users who have interacted with them. For these users, an option that allows a user to directly set whether to expose interaction information may be provided.

According to an embodiment of the present disclosure, interaction information interfaces 600 and 650 may respectively include exposure setting interfaces 630*a* and 630*b*. The exposure setting interfaces 630*a* and 630*b* may provide a function of setting whether to expose a user to an interaction information interface of another user. For example, based on a user input with respect to the exposure setting interfaces 630*a* and 630*b*, the user may set to be exposed to the interaction information interface of another user in the exposure setting interface 630*a* or set not to be exposed to the interaction information interface of another user in the exposure setting interface 630*b*. In an embodiment, the exposure setting of a user may be stored in a game providing apparatus.

In an embodiment, when a game providing apparatus obtains statistical information related to an occurrence of a certain interaction event between a user and another user from a stored game log, the game providing apparatus may obtain the statistical information by using only an interaction event log occurred with the other user who was set to be exposed to the interaction information interface. That is, the game providing apparatus may obtain the statistical information by analyzing game logs except for logs related to another user who was set not to be exposed to the interaction information interface. Accordingly, information of the other user who was set not to be exposed may not be displayed in the interaction information interface 600.

In an embodiment, when a user sets not to be exposed to an interaction information interface of another user in the exposure setting interface 630*b*, the game providing apparatus may not obtain statistical information related to a certain interaction event between users, and may not display an interaction event information interface 610 and an user information interface 620, on the interaction information interface 650. In other words, the game providing apparatus may provide, through the interaction information interface 600, information related to an interaction occurred between users only to the user who set to be exposed to the interaction information interface of the other user. In another embodiment, even when the user set not to be exposed to the interaction information interface of another user, information related to an interaction occurred between users may also be provided through the interaction information interface 600.

FIG. 6 only shows an example in which the exposure setting interfaces 630*a* and 630*b* are included in the interaction information interface 600, but in another embodiment, whether to expose a user to the interaction information interface of another user may be set by an external interface other than the interaction information interface 600.

FIG. 7 is a diagram for explaining an interface that provides information and interaction between users in a certain period, according to an embodiment of the present disclosure.

In an embodiment, a game providing apparatus may obtain statistical information related to a certain interaction event occurred between a user and another user in a certain period from a stored game log, and display an interaction information interface 700 based on the obtained statistical information. The game providing apparatus may extract a certain interaction event log generated between a user and another user in a certain period from a stored game log and analyze the extracted interaction event log to obtain statistical information including information of at least one other user who has had an occurrence of a certain interaction event with the user in a certain period and the number of times the certain interaction event has occurred with respect to the at least one other user.

In an embodiment, the certain period may be designated as a regular time interval, such as the last hour, the last day, the last week, or the last month. In an embodiment, the certain period may be designated in a unit of game sessions (e.g., a recent 1 session, recent 10 sessions, or the like) indicating from when the user logs in to when the user logs out. In an embodiment, the certain period may be any identifiable time unit (e.g., game season, event period, or the like) designated by a game service provider.

In an embodiment, the game providing apparatus may obtain statistical information related to a certain interaction event occurred between a user and another user in a plurality of different periods. For example, the game providing apparatus may obtain first statistical information related to a certain interaction event occurred between the user and another user in a first period, and obtain second statistical information related to a certain interaction event occurred between the user and another user in a second period.

In an embodiment, the game providing apparatus may display a plurality of interaction event information interfaces 710 and 715 and a plurality of user information interfaces 720 and 725, which are respectively related to different periods from each other, on the interaction information interface 700, based on statistical information corresponding to a plurality of different periods. For example, the interaction information interface 700 may include an interaction event information interface 710 that displays a first user who has had the most occurrences of a certain interaction event with the user in a first period based on the first statistical information, a user information interface 720, an interaction event information interface 715 that displays a second user who has had the most occurrence of a certain interaction events with the user in a second period based on the second statistical information, and a user information interface 725.

Although only the interaction information interface 700 is illustrated in FIG. 7, it will be understood that statistical information corresponding to a certain period may be equally provided through an expanded interaction information interface according to various embodiments of the present disclosure.

FIG. 8 is a flowchart of a method of requesting another user for an additional interaction, according to various embodiments of the present disclosure. These operations may be performed by the user terminals 110 to 160 and the server 170 shown in FIG. 1, the game providing apparatus 1000 or the processor 1010 of the game providing apparatus 1000 shown in FIG. 10.

Referring to FIG. 8, in operation S810, a game providing apparatus may obtain statistical information related to a certain interaction event occurred between a user and another user from a stored game log. In operation S820, the game providing apparatus may display an interaction information interface that displays another user who has had the most occurrences of a certain interaction event with the user, based on the obtained statistical information. In operation S830, the game providing apparatus may display, on an expanded interaction information interface, at least one other user in an order from a greatest number of times a certain interaction event has occurred with the user, based on a user input of expanding the interaction information interface. Operations S810, S820, and S830 respectively correspond to operations S210, S220, and S230, and thus descriptions thereof will be omitted.

In operation S840, the game providing apparatus may obtain a user input of selecting one of the at least one other user through the interaction information interface. In an embodiment, the user input may be obtained through the interaction information interface before expansion and the expanded interaction information interface.

In operation S850, the game providing apparatus may obtain an interaction request for a selected user based on a user input of selecting one of the at least one other user. The interaction request may include at least one of a match request for the selected user, a group participation request for the selected user, a friend registration request for the selected user, and an item transaction request for the selected user. However, the present disclosure is not limited thereto, and the game providing apparatus may obtain a request related to any interaction that may occur between users in the game.

In an embodiment, the game providing apparatus may display an additional interaction interface for selecting an interaction to be requested for the selected user in response to the user input of selecting one of the at least one other user. The game providing apparatus may obtain a user input of selecting an additional interaction through the additional interaction interface, and may request the selected user for the interaction selected by the user input.

In an embodiment, when the obtained interaction request requires counterpart's approval, the game providing apparatus may transmit the interaction request to the selected user and request the approval. When the selected user's interaction approval is obtained, the game providing apparatus may control to make the user and the selected users interact.

In another embodiment, when the obtained interaction request does not require approval from another party, the game providing apparatus may determine the validity of the interaction request, and control to make the user and the selected users interact when the interaction request is valid.

Figure 9:
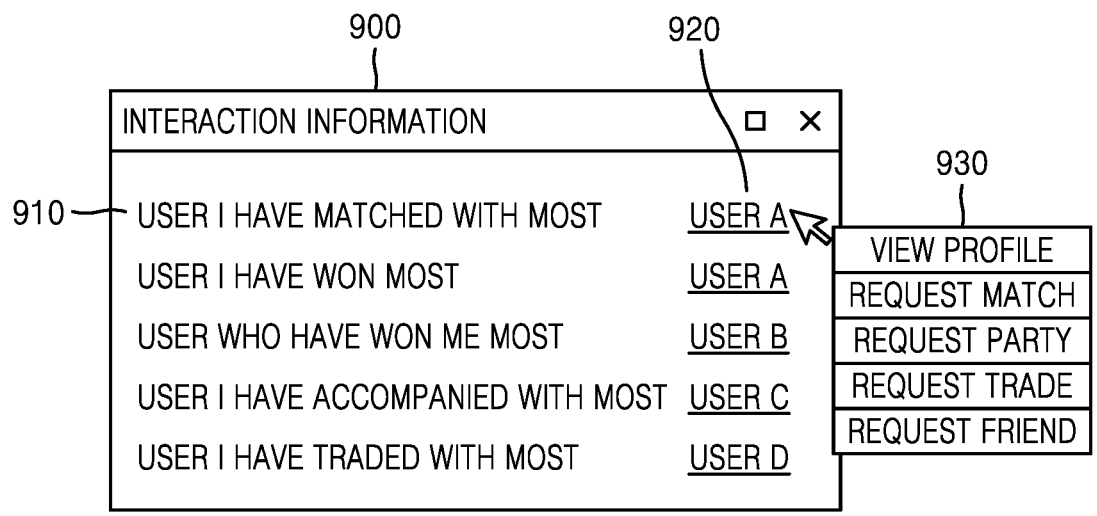
FIG. 9 is a diagram for explaining a method of requesting another user for an additional interaction, according to an embodiment of the present disclosure.

FIG. 9 is a diagram for explaining a method of requesting another user for an additional interaction, according to an embodiment of the present disclosure.

FIG. 9 shows an example of the interaction information interface 900 displayed in a user terminal. According to various embodiments of the present disclosure, the interaction information interface 900 may include at least one interaction event information interface 910, at least one user information interface 920 corresponding thereto, and an additional interaction interface 930 corresponding to the at least one user information interface 920. The interaction information interface 900 is not limited to the example of FIG. 9, and more or less components than those shown in FIG. 9 may be included in the interaction information interface 900.

The interaction event information interface 910 and the user information interface 920 may respectively correspond to the interaction event information interface 310 and the user information interface 320 of FIG. 3. Accordingly, description already given with reference to FIG. 3 is omitted.

According to an embodiment of the present disclosure, the user information interface 920 may provide a function that displays the additional interaction interface 930. For example, when a user input with respect to the user information interface 920 is obtained, the additional interaction interface 930 for selecting an interaction to be requested for a user may be displayed.

According to an embodiment of the present disclosure, the additional interaction interface 930 may be an interface indicating at least one interaction which may be requested for another user. In response to the obtaining of a user input of selecting one of the at least one interaction through the additional interaction interface 930, the selected interaction may be requested for a user corresponding to the user information interface 920.

For example, the additional interaction interface 930 may provide a function that displays information of another user in more detail. For example, the additional interaction interface 930 may provide a function that requests another user for a match. For example, the additional interaction interface 930 may provide a function that invites e another user to a user's group or requests the other user to invite the user to a group of the other user. For example, the additional interaction interface 930 may provide a function that requests another user to perform a mission together. For example, the additional interaction interface 930 may provide a function that requests other user for a trade. For example, the additional interaction interface 930 may provide a function that registers another user to a friend list. The present disclosure is not limited thereto, and the at least one interaction provided by the additional interaction interface 930 may be any interaction between users possible in the game.

Although not illustrated in FIG. 9, it will be understood that a function of requesting an additional interaction may also be equally provided through an expanded interaction information interface according to various embodiments of the present disclosure.

Through the above-described interface, the user may easily request another user who has interacted with him/her for an additional interaction. Accordingly, a one-time interaction with another user does not stop and an opportunity to form an additional relationship may be increased. Accordingly, a formation path of a network between users may be diversified, and a quantitative and qualitative improvement of a user community may be induced.

Figure 10:
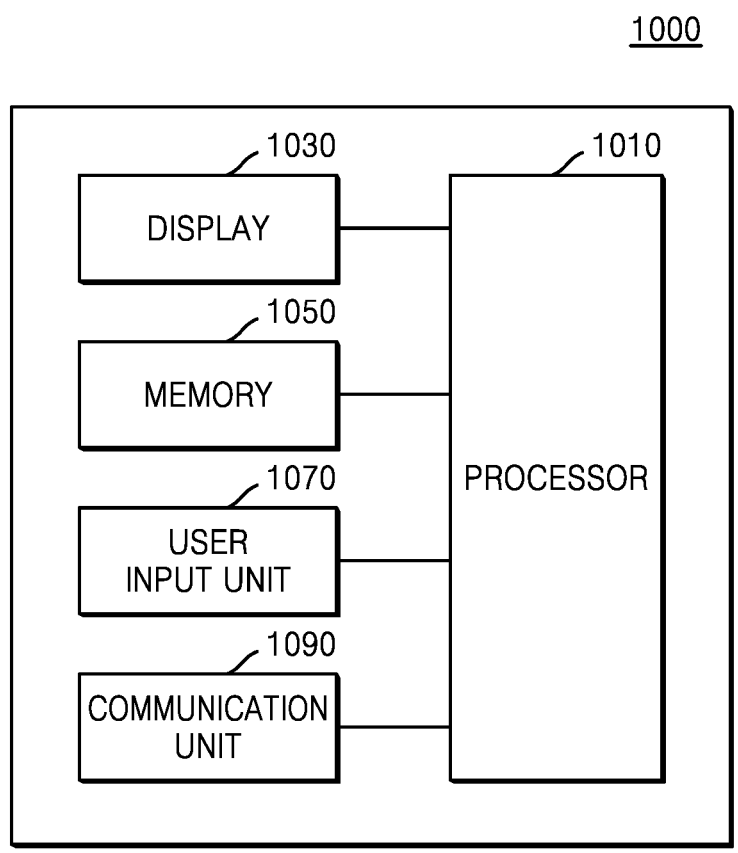
FIG. 10 is a diagram for explaining a detailed configuration of a game providing apparatus according to various embodiments of the present disclosure.

FIG. 10 is a diagram for explaining a detailed configuration of the game providing apparatus 1000 according to various embodiments of the present disclosure.

As shown in FIG. 10, the game providing apparatus 1000 according to some embodiments may include at least one processor 1010, a display 1030, a memory 1050, a user input unit 1070, and a communication unit 1090. However, not all of the components illustrated in FIG. 10 are essential components of the game providing apparatus 1000. The game providing apparatus 1000 may also be implemented by more or less components than the components illustrated in FIG. 10. The game providing apparatus 1000 may be a user terminal, a server, a game network system, or a separate device.

According to some embodiments, the processor 1010 typically controls the overall operation of the game providing apparatus 1000. For example, the processor 1010 may generally control the display 1030, the memory 1050, the user input unit 1070, the communication unit 1090, or the like by executing a program stored in the memory 1050. The processor 1010 may control an operation of the game providing apparatus 1000 in the present disclosure by controlling the display 1030, the memory 1050, the user input unit 1070, the communication unit 1090, or the like.

According to an embodiment of the present disclosure, the processor 1010 may obtain statistical information related to a certain interaction event occurred between a user and another user from a game log stored in the memory 1050. The processor 1010 may display, through the display 1030, a display interface that displays a user who has had the most occurrences of a certain interaction event with the user, based on the obtained statistical information. The processor 1010 may be configured to display, through the display 1030, at least one other user on an interface in an order from the greatest number of times the certain interaction events has occurred with the user, based on a user input from the user input unit 1070 for expanding the interface.

According to an embodiment of the present disclosure, the processor 1010 may be configured to extract a certain interaction event occurred between the user and another user from a game log stored in the memory 1050 and analyze the extracted interaction event to obtain information of at least one other user who has had an occurrence of a certain interaction event with the user and the number of times the certain interaction event has occurred with respect to the at least one other user.

According to an embodiment of the present disclosure, the processor 1010 may be configured to set whether to expose a user to the interface by a user input obtained from the user input unit 1070 and obtain statistical information related to at least one other user who has had an occurrence of a certain interaction event with the user among users set to be exposed on the interface.

According to an embodiment of the present disclosure, the processor 1010 may control not to obtain statistical information and not to display another user who has had an occurrence of a certain interaction event with the user on the interface when the user set not to be exposed to the interface.

According to an embodiment of the present disclosure, the processor 1010 may be configured to obtain statistical information related to a certain interaction event that occurred between the user and another user in a certain period.

According to an embodiment of the present disclosure, the processor 1010 may be configured to obtain first statically information related to a certain interaction event that occurred between the user and another user in a first period, obtain second statistical information related to a certain interaction event that occurred between the user and another user in a second period, display, through the display 1030, a user who has had the most occurrence of a certain interaction event with the user in the first period on the interface based on the first statistical information, and display, through the display 1030, a user who has had the most occurrences of a certain interaction event with the user in the second period on the interface based on the second statistical information.

According to an embodiment of the present disclosure, the processor 1010 may be configured to obtain, from the user input unit 1070, a user input of selecting one of at least one other user through an interface, and obtain an interaction request for a selected user based on the obtained user input.

According to an embodiment of the present disclosure, the processor 1010 may be configured to store statistical information in the memory 1050 and update the statistical information stored in the memory 1050 when a certain interaction event occurs between the user and another user.

The display 1030 may display and output information processed by the game providing apparatus 1000. The display 1030 may include at least one of a liquid crystal display, a thin film transistor-liquid crystal display, an organic light-emitting diode, a flexible display, a three-dimensional (3D) display, and an electrophoretic display. When the display 1030 and a touch pad form a layer structure to configure a touch screen, the display 1030 may be used as an input apparatus in addition to an output apparatus. However, the present disclosure is not limited thereto. The display 1030 may output a game screen including graphic interfaces according to various embodiments of the present disclosure under the control of the processor 1010.

According to an embodiment of the present disclosure, the display 1030 may display an interface that displays another user who has had the most occurrences of a certain interaction event with the user. In an embodiment, the display 1030 may display an expanded interface that displays at least one other user in an order from the greatest number of times a certain interaction event has occurred with the user. In an embodiment, the display 1030 may remove the interface or the expanded interface from a screen.

In addition, the memory 1050 may store a program for processing and controlling the processor 1010, and may also store data input to or output from the game providing apparatus 1000. According to an embodiment of the present disclosure, the memory 1050 may also store information related to a user account or information related to a game. According to an embodiment of the present disclosure, the memory 1050 may store a game log. According to an embodiment of the present disclosure, the memory 1050 may store statistical information related to a certain interaction event between the user and another user, the statistical information being obtained from the game log.

According to an embodiment of the present disclosure, the processor 1010 may execute a method of providing information about interaction between users by using a program stored in the memory 1050.

According to an embodiment of the present disclosure, the memory 1050 may include at least one type of storage media among memories (for example, SD or XD memory, etc.) of a flash memory type, a hard disk type, a multimedia card micro type, and a card type, random access memory (RAM), static random access memory (SRAM), read only memory (ROM), electrically erasable programmable read-only memory (EEPROM), programmable read only memory (PROM), a magnetic memory, a magnetic disk, and an optical disk. In addition, according to an embodiment of the present disclosure, programs stored in the memory 1050 may be classified into a plurality of modules according to their functions.

The user input unit 1070 may mean a unit for a user to input data for controlling the game providing apparatus 1000. For example, the user input unit 1070 may include apparatuses capable of receiving various types of user inputs, such as a keyboard, a physical button, a mouse, a joystick, a touch screen, a touch pad, a camera, or a microphone. For example, the user input unit 1070 may include various interfaces, such as a key pad, a dome switch, a voice input interface, a fingerprint input interface, a touch input interface (a contact capacitance type, a pressure resistive film type, an infrared sensing type, a surface ultrasonic conduction type, an integral tension measurement type, a piezo effect type, etc.), a camera, a jog wheel, a jog switch, or the like, and may also link various sensors, such as an acceleration sensor, a position sensor, a temperature sensor, an optical sensor, etc. with the user input unit. However, the present disclosure is not limited thereto, and the user input unit 1070 may include an apparatus supporting various types of inputs.

According to an embodiment of the present disclosure, the user input unit 1070 may obtain a user input of expanding an interaction information interface. According to an embodiment of the present disclosure, the user input unit 1070 may obtain, through the interaction information interface, a user input of selecting one of at least one other user displayed on the interaction information interface to request an interaction.

According to an embodiment of the present disclosure, the communication unit 1090 may perform communication with an external apparatus under the control of the processor 1010. For example, the communication unit 1090 may perform communication with an external apparatus, such as a payment server or an authentication server, under the control of the processor 1010. In addition, the communication unit 1090 may also obtain user information or a user input through communication with an external interface.

According to an embodiment of the present disclosure, the communication unit 1090 may include a Bluetooth communication unit, a Bluetooth Low Energy (BLE) communication unit, a near field communication unit, a WLAN (WiFi) communication unit, a ZigBee communication unit, an infrared data association (IrDA) communication unit, a WiFi Direct (WFD) communication unit, an Ultra Wideband (UWB) communication unit, an Ant+ communication unit, or the like, but is not limited thereto.

In addition, according to an embodiment of the present disclosure, the communication unit 1090 transmits and receives a wireless signal to and from at least one of a base station, an external terminal, and a server through a mobile communication network. Here, the wireless signal may include various types of data according to transmission and reception of a voice call signal, a video call signal, or a text/multimedia message.

According to an embodiment of the present disclosure, a method of providing information about interaction between users may be performed by the game providing apparatus 1000 or may be performed by a server or a user terminal, and in addition, at least one component included in the game providing apparatus 1000 may perform the embodiments described with reference to FIGS. 1 to 10.

In addition, the method of providing information about interaction between users may also be performed individually or together by the server and the user terminal. The configuration of the user terminal will be described in more detail below with reference to FIG. 11.

Figure 11:
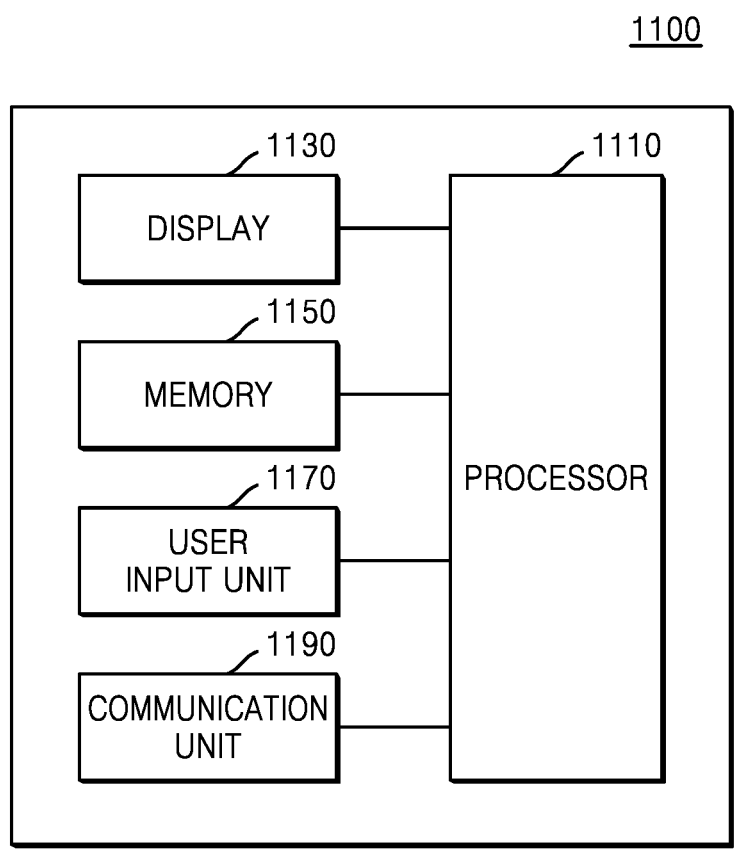
FIG. 11 is a diagram for explaining a detailed configuration of a user terminal according to various embodiments of the present disclosure.

FIG. 11 is a diagram for explaining a detailed configuration of a user terminal 1100 according to various embodiments of the present disclosure.

As shown in FIG. 11, the user terminal 1100 according to some embodiments may include at least one processor 1110, a display 1130, a memory 1150, a user input unit 1170, and a communication unit 1190. However, not all of the components illustrated in FIG. 11 are essential components of the user terminal 1100. The user terminal 1100 may also be implemented by more or less components than the components illustrated in FIG. 11.

According to an embodiment of the present disclosure, the processor 1110 typically controls the overall operation of the user terminal 1100. For example, the processor 1110 may generally control the display 1130, the memory 1150, the user input unit 1170, the communication unit 1190, or the like by executing a program stored in the memory 1150. The processor 1110 may control an operation of the user terminal 1100 in the present disclosure by controlling the display 1130, the memory 1150, the user input unit 1170, the communication unit 1190, or the like.

According to an embodiment of the present disclosure, the processor 1110 may obtain statistical information related to a certain interaction event that occurred between a user and another user from a server through the communication unit 1190. The processor 1110 may display, through the display 1130, a display interface that displays a user who has had the most occurrences of a certain interaction event with the user, based on the obtained statistical information. The processor 1110 may be configured to display, through the display 1130, at least one other user on an interface in an order from the greatest number of times the certain interaction event has occurred with the user, based on a user input from the user input unit 1170 for expanding the interface.

According to an embodiment of the present disclosure, the processor 1110 may be configured to obtain, from the user input unit 1170, a user input of selecting one of at least one other user through an interface, and transmit an interaction request for the selected user to a server through the communication unit 1190 based on the obtained user input.

According to an embodiment of the present disclosure, the operation of the processor 1110 corresponds to the operation of the game providing apparatus 1000 described with reference to FIG. 10, and thus a detailed description thereof is omitted.

The display 1130 may display and output information processed by the user terminal 1100. The display 1130 may include at least one of a liquid crystal display, a thin film transistor-liquid crystal display, an organic light-emitting diode, a flexible display, a 3D display, and an electrophoretic display. When the display 1130 and a touch pad form a layer structure to configure a touch screen, the display 1130 may be used as an input apparatus in addition to an output apparatus. However, the present disclosure is not limited thereto. The display 1130 may output a game screen including graphic interfaces according to various embodiments of the present disclosure under the control of the processor 1110.

According to an embodiment of the present disclosure, the display 1130 may display an interface that displays another user who has had the most occurrences of a certain interaction event with the user. In an embodiment, the display 1130 may display an expanded interface that displays at least one other user in an order from the greatest number of times a certain interaction event has occurred with the user. In an embodiment, the display 1130 may remove the interface or the expanded interface from a screen.

The memory 1150 may store a program for processing and controlling the processor 1110, and may also store data input to or output from the user terminal 1100. According to an embodiment of the present disclosure, the memory 1150 may also store information related to a user account or information related to a game.

According to an embodiment of the present disclosure, the processor 1110 may execute a method of providing information about interaction between users by using a program stored in the memory 1150.

According to some embodiments, the memory 1150 may include at least one type of storage media among memories (for example, SD or XD memory, etc.) of a flash memory type, a hard disk type, a multimedia card micro type, and a card type, RAM, SRAM, ROM, EEPROM, PROM, a magnetic memory, a magnetic disk, and an optical disk. In addition, according to an embodiment of the present disclosure, programs stored in the memory 1150 may be classified into a plurality of modules according to their functions.

The user input unit 1170 may mean a unit for a user to input data for controlling the user terminal 1100. For example, the user input unit 1170 may include apparatuses capable of receiving various types of user inputs, such as a keyboard, a physical button, a mouse, a joystick, a touch screen, a touch pad, a camera, or a microphone. For example, the user input unit 1170 may include various interfaces, such as a key pad, a dome switch, a voice input interface, a fingerprint input interface, a touch input interface (a contact capacitance type, a pressure resistive film type, an infrared sensing type, a surface ultrasonic conduction type, an integral tension measurement type, a piezo effect type, etc.), a camera, a jog wheel, a jog switch, or the like, and may also link various sensors, such as an acceleration sensor, a position sensor, a temperature sensor, an optical sensor, etc. with the user input unit. However, the present disclosure is not limited thereto, and the user input unit 1170 may include an apparatus supporting various types of inputs.

According to an embodiment of the present disclosure, the user input unit 1170 may obtain a user input for expanding an interaction information interface. According to an embodiment of the present disclosure, the user input unit 1170 may obtain, through the interaction information interface, a user input for selecting one of at least one other user displayed on the interaction information interface to request an interaction.

According to an embodiment of the present disclosure, the communication unit 1190 may perform communication with an external apparatus under the control of the processor 1110. For example, the communication unit 1190 may perform communication with an external apparatus, such as a payment server or an authentication server, under the control of the processor 1110. In addition, the communication unit 1190 may also obtain user information or a user input through communication with an external interface.

According to an embodiment of the present disclosure, the communication unit 1190 may receive statistical information from a server under the control of the processor 1110. According to an embodiment of the present disclosure, the communication unit 1190 may transmit an interaction request for another user to a server under the control of the processor 1110.

According to an embodiment of the present disclosure, the communication unit 1190 may include a Bluetooth communication unit, a BLE communication unit, a near field communication unit, a WLAN (Wi-Fi) communication unit, a Zigbee communication unit, an IrDA communication unit, a WFD communication unit, an UWB communication unit, an Ant+ communication unit, or the like, but is not limited thereto.

In addition, according to an embodiment of the present disclosure, the communication unit 1190 transmits and receives a wireless signal to and from at least one of a base station, an external terminal, and a server through a mobile communication network. Here, the wireless signal may include various types of data according to transmission and reception of a voice call signal, a video call signal, or a text/multimedia message.

The apparatus described above may be implemented as a hardware component, a software component, and/or a combination of the hardware component and the software component. For example, the apparatuses and configuration elements described in the embodiments may be implemented by using one or more general-purpose computers or special-purpose computers, such as processors, controllers, arithmetic logic units (ALUs), digital signal processors, microcomputers, field programmable gate arrays (FPGAs), programmable logic units (PLUs), microprocessors, or any other apparatuses capable of executing and responding to instructions. A processing apparatus may perform an operating system (OS) and one or more software applications running on the operating system. In addition, the processing apparatus may also access, store, operate, process, and generate data in response to execution of software. For convenience of understanding, one processing apparatus may be described as being used, but those skilled in the art may understand that the processing apparatus may include a plurality of processing elements and/or a plurality of types of processing elements. For example, the processing apparatus may include a plurality of processors or may include one processor and one controller. In addition, other processing configurations such as parallel processors are possible.

The software may include a computer program, code, instructions, or a combination of one or more thereof, and may configure the processing apparatus to operate as desired or instruct the processing apparatus independently or collectively. The software and/or the data may be embodied permanently or temporarily in any type of machine, a configuration element, a physical apparatus, virtual equipment, a computer storage medium, an apparatus, or a signal wave to be transmitted to be interpreted by the processing apparatus or to provide instructions or data to the processing apparatus. Software may also be distributed to networked computer systems to be stored therein or executed thereby. Software and data may be stored on one or more computer-readable recording media.

A method according to an embodiment may be implemented in the form of program instructions that may be executed by various computer systems to be recorded in a computer-readable medium. The computer-readable medium may include program instructions, data files, data structures, and so on alone or in combination. The program instructions recorded on the medium may be specially designed and configured for the embodiment or may also be known and usable to those skilled in computer software. For example, computer-readable recording media include magnetic media such as a hard disk, a floppy disk, and a magnetic tape, optical media such as CD-ROM and DVD, magnetic-optical media such as floptical disks, and a hardware apparatus specifically configured to store and execute program instructions, such as ROM, RAM, and flash memory. For example, the program instructions include not only machine a language code such as a code produced by a compiler but also a high-level language code that may be executed by a computer by using an interpreter or so on. The hardware device described above may be configured to operate as one or more software modules to perform the operation of the embodiment, and vice versa.

According to various embodiments of the present disclosure, an interface through which a user may easily check an interaction that occurred between users may be provided.

According to various embodiments of the present disclosure, an interface through which a user may easily request an additional interaction for another user may be provided.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A method of providing information about interaction between users, the method comprising:
   obtaining, from a stored game log, statistical information related to a plurality of interaction events that have occurred between a first user associated with a first user device and a plurality of users that are each associated with a corresponding user device, wherein the plurality of interaction events includes a collaborative event between the first user and one or more other users of the plurality of user;
   displaying a first interface that displays respectively a second user of the plurality of users who has had most occurrences of a certain interaction event with the first user for each interaction event included in the plurality of interaction events, based on the statistical information;
   obtaining a user input for expanding the first interface with respect to the certain interaction event of the plurality of interaction events through the first interface; and
   displaying a second interface that displays a first subset of users of the plurality of users that has participated in the certain interaction event with the first user in order from a greatest number of times the certain interaction event has occurred with the first user, based on the user input of expanding the first interface, wherein the first subset of users includes the second user.

2. The method of claim 1, wherein the obtaining the statistical information comprises:
   extracting, from the stored game log, a certain interaction event log generated between the first user and the second user; and
   obtaining information on a third user of the plurality of users who has had occurrences of the certain interaction event of the plurality of interaction events with the first user and a number of times the certain interaction event that has occurred with respect to the third user by analyzing the extracted certain interaction event log.

3. The method of claim 1, wherein the certain interaction event comprises at least one of a match between the first user and the second user, a victory of the first user over the second user, a defeat of the first user by the second user, a common group participation of the first user and the second user, performing of common content of the first user and the second user, and an item trade between the first user and the second user.

4. The method of claim 1, further comprising:
   setting, by a user input, whether to expose a third user of the plurality of users to the first or second interfaces of a fourth user of the plurality of users,
   wherein the obtaining of the statistical information comprises obtaining statistical information related to a fifth user of the plurality of users who has had the certain interaction event with the first user among the plurality of users set to be exposed to the first or second interfaces of a sixth user of the plurality of users.

5. The method of claim 4, wherein, when the first user is set not to be exposed to the first or second interfaces of a seventh user of the plurality of users, the statistical information is not obtained, and the fifth user who has had occurrences of the certain interaction event with the first user is not displayed on the first or second interface.

6. The method of claim 1, wherein the statistical information includes statistical information related to the certain interaction event that has occurred between the first user and second user in a certain period.

7. The method of claim 1, wherein the obtaining of the statistical information comprises:
   obtaining first statistical information related to the plurality of interaction events that has occurred between the first user and the second user in a first period; and
   obtaining second statistical information related to the plurality of interaction events that has occurred between the first user and the second user in a second period,
   wherein the displaying the first interface comprises:
   displaying, on the first interface, a third user of the plurality of users who has had most occurrences of the certain interaction event with the first user in the first period, based on the first statistical information; and
   displaying, on the first interface, a fourth user of the plurality of users who has had most occurrences of the certain interaction event with the first user in the second period, based on the second statistical information.

8. The method of claim 1, wherein the obtaining the user input further comprises:
   obtaining, via the first interface, the user input of selecting a selected user of the first subset of users; and
   obtaining an interaction request for the selected user based on the user input of selecting the selected user of the first subset of users, wherein the interaction request comprises at least one of a match request for the selected user, a group participation request for the selected user, a friend registration request for the selected user, and an item trade request for the selected user.

9. The method of claim 1, further comprising:
updating the statistical information when the certain interaction event occurs between the first user and the second user.

10. A game providing apparatus configured to provide information about interaction between users, the game providing apparatus comprising:
a user input unit;
a display;
a communication unit;
a memory storing a game log and instructions; and
at least one processor functionally connected to the communication unit and the memory and configured to execute the instructions, wherein the at least one processor is configured to execute the instructions to:
obtain, from the stored game log, statistical information related to a plurality of interaction events that have occurred between a first user associated with a first user device and a plurality of users that are each associated with a corresponding user device, wherein the plurality of interaction events includes a collaborative event between the first user and one or more other users of the plurality of user;
display a first interface that displays respectively a second user of the plurality of users who has had most occurrences of a certain interaction event with the first user for each interaction event included in the plurality of interaction events, based on the statistical information;
obtain a user input for expanding the first interface with respect to the certain interaction event of the plurality of interaction events through the first interface; and
display a second interface that displays a first subset of users of the plurality of users that has participated in the certain interaction event with the first user in order from a greatest number of times the certain interaction event has occurred with the first user, based on the user input of expanding the first interface, wherein the first subset of users includes the second user.

11. The game providing apparatus of claim 10, wherein the at least one processor is configured to execute the instructions to:
extract, from the stored game log, a certain interaction event log generated between the first user and the second user; and
obtain information on a third user of the plurality of users who has had occurrences of the certain interaction event of the plurality interaction events with the first user and a number of times the certain interaction event that has occurred with respect to the third user by analyzing the extracted certain interaction event log.

12. The game providing apparatus of claim 10, wherein the certain interaction event comprises at least one of a match between the first user and the second user, a victory of the first user over the second user, a defeat of the first user by the second user, a common group participation of the first user and the second user, performing of common content of the first user and the second user, and an item trade between the first user and the second user.

13. The game providing apparatus of claim 10, wherein the at least one processor is further configured to execute the instructions to:

setting, by a second user input, whether to expose a third user of the plurality of users to the first or second interfaces of a fourth user of the plurality of users,
wherein the obtaining of the statistical information comprises obtaining statistical information related to a fifth user of the plurality of users who has had the certain interaction event with the first user among the plurality of users set to be exposed to the first or second interfaces of a sixth user of the plurality of users.

14. The game providing apparatus of claim 13, wherein, when the first user is set not to be exposed to the first or second interface of the fifth user of the plurality of users, the statistical information is not obtained, and the fifth user who has had occurrences of the certain interaction event with the first user is not displayed on the first or second interface.

15. The game providing apparatus of claim 10, wherein the statistical information includes statistical information related to the certain interaction event that has occurred between the first user and second user in a certain period.

16. The game providing apparatus of claim 10, wherein the at least one processor is further configured to execute the instructions to:
obtaining, via the first interface, the user input of selecting a selected user of the first subset of users; and
obtaining an interaction request for the selected user based on the user input of selecting the selected user of the first subset of users.

17. The game providing apparatus of claim 16, wherein the interaction request comprises at least one of a match request for the selected user, a group participation request for the selected user, a friend registration request for the selected user, and an item trade request for the selected user.

18. A computer-readable recording medium comprising a program executing a method of providing information about interaction between users on a computer, the computer-readable recording medium comprising:
obtaining, from a stored game log, statistical information related to a plurality of interaction events that have occurred between a first user associated with a first user device and a plurality of users that are each associated with a corresponding user device, wherein the plurality of interaction events includes a collaborative event between the first user and one or more other users of the plurality of users;
displaying a first interface that displays respectively a second user of the plurality of users who has had most occurrences of a certain interaction event with the first user for each interaction event included in the plurality of interaction events, based on the statistical information;
obtaining a user input for expanding the first interface with respect to the certain interaction event of the plurality of interaction events through the first interface; and
displaying a second interface that displays a first subset of users of the plurality of users that has participated in the certain interaction event with the first user in an order from a greatest number of times the certain interaction event has occurred with the first user, based on the user input, wherein the first subset of users includes the second user.

19. The method of claim 1, wherein displaying the second interface includes displaying the first subset of users that has participated in the certain interaction event with the first user in order from the greatest number of times the certain interaction event has repeatedly occurred with the first user.

20. The method of claim 1, wherein the collaborative event includes at least one of:
- the first user and the one or more other users performing a common mission together; or
- one of the first user, or the one or more other users healing each other.

* * * * *